US009282418B2

(12) United States Patent
Tam

(10) Patent No.: US 9,282,418 B2
(45) Date of Patent: Mar. 8, 2016

(54) COGNITIVE LOUDSPEAKER SYSTEM

(76) Inventor: Kit S. Tam, Menlo Park, CA (US)

( * ) Notice: Subject to any disclaimer, the term of this patent is extended or adjusted under 35 U.S.C. 154(b) by 1015 days.

(21) Appl. No.: 13/098,237

(22) Filed: Apr. 29, 2011

(65) Prior Publication Data

US 2011/0270428 A1 Nov. 3, 2011

Related U.S. Application Data

(60) Provisional application No. 61/330,640, filed on May 3, 2010.

(51) Int. Cl.
*G06F 17/00* (2006.01)
*H04S 3/00* (2006.01)

(52) U.S. Cl.
CPC ........... *H04S 3/008* (2013.01); *H04R 2227/005* (2013.01); *H04R 2420/07* (2013.01)

(58) Field of Classification Search
CPC .............. H04S 3/008; H04R 2227/005; H04R 2420/07
USPC ........................................................... 700/94
See application file for complete search history.

(56) References Cited

U.S. PATENT DOCUMENTS 6,094,671 A 7/2000 Chase et al.
RE38,405 E 1/2004 Clair, Jr. et al.
7,539,219 B2 5/2009 Kwong et al.
7,684,377 B2 3/2010 Lee et al.
7,702,403 B1 4/2010 Gladwin et al.
7,805,210 B2 * 9/2010 Cucos et al. .................... 700/94
7,987,294 B2 * 7/2011 Bryce et al. ................... 709/248
2001/0041588 A1 11/2001 Hollstrom et al.
2002/0002039 A1 * 1/2002 Qureshey et al. ............. 455/344
2002/0072816 A1 * 6/2002 Shdema et al. ................. 700/94
2002/0124097 A1 * 9/2002 Isely et al. .................... 709/231

(Continued)

FOREIGN PATENT DOCUMENTS

JP S64-044199 A 2/1989
JP 2005-079614 A 3/2005

(Continued)

OTHER PUBLICATIONS

Yamaha DME Manual; Copyright 2004.*

(Continued)

*Primary Examiner* — Paul McCord
(74) *Attorney, Agent, or Firm* — Bever, Hoffman & Harms, LLP

(57) ABSTRACT

A cognitive loudspeaker system including a control station that communicates wirelessly and bi-directionally with a plurality of sound production stations. The control station and the sound production stations are initially synchronized to a conductor clock. Configuration information is then transmitted from the sound production stations to the control station. In response, the control station generates playback executables, which are transmitted to the sound production stations. The control station also transmits digital audio information to the sound production stations. Within each sound production station, the previously received playback executable is used to control the decoding and processing of the received digital audio information. Each sound production station generates digital audio output samples, which are converted to analog output signals. These analog output signals are amplified and are used to drive loudspeakers.

20 Claims, 17 Drawing Sheets

(56) References Cited

U.S. PATENT DOCUMENTS

| | | | | |
|---|---|---|---|---|
| 2003/0185542 | A1 | 10/2003 | McVeigh et al. | |
| 2005/0086273 | A1 | 4/2005 | Loebbert et al. | |
| 2005/0113058 | A1 | 5/2005 | Gosieski, Jr. | |
| 2005/0190928 | A1 | 9/2005 | Noto | |
| 2005/0234731 | A1 | 10/2005 | Sirivara et al. | |
| 2006/0126586 | A1* | 6/2006 | Um et al. | 370/338 |
| 2007/0022207 | A1* | 1/2007 | Millington | 709/231 |
| 2007/0214229 | A1* | 9/2007 | Millington et al. | 709/208 |
| 2008/0092204 | A1 | 4/2008 | Bryce et al. | |
| 2008/0175395 | A1 | 7/2008 | Rice | |
| 2008/0181424 | A1* | 7/2008 | Schulein et al. | 381/74 |
| 2009/0164905 | A1* | 6/2009 | Ko | 715/727 |
| 2009/0169030 | A1* | 7/2009 | Inohara | 381/80 |
| 2009/0180465 | A1* | 7/2009 | Closset et al. | 370/350 |
| 2009/0180631 | A1* | 7/2009 | Michael et al. | 381/58 |
| 2009/0304194 | A1* | 12/2009 | Eggleston et al. | 381/59 |
| 2010/0022183 | A1 | 1/2010 | Ryle et al. | |
| 2010/0272270 | A1* | 10/2010 | Chaikin et al. | 381/59 |
| 2010/0299639 | A1* | 11/2010 | Ramsay et al. | 715/835 |
| 2011/0015769 | A1* | 1/2011 | Haatainen | 700/94 |

FOREIGN PATENT DOCUMENTS

| | | | |
|---|---|---|---|
| JP | 2010-056970 | A | 3/2010 |
| WO | 2004034602 | A1 | 4/2004 |
| WO | 2008/103091 | A1 | 8/2008 |
| WO | 2008/113053 | A1 | 9/2008 |
| WO | WO2009112070 | * | 9/2009 |

OTHER PUBLICATIONS

ID3 Draft specifictaion: Copyright 1998.*

"Ultra-Wideband Wireless Systems", by G. Roberto Aiello and Gerald D. Rogerson, pp. 36-47, IEEE Microwave magazine, Jun. 2003.

"UWB Standardization Effort Ends in Controversy" by David Geer, pp. 13-16, IEEE Computer Society, Jul. 2006.

"An Energy-Efficient All-Digital UWB Transmitter Employing Dual Capacitively-Couple Pulse-Shaping Drivers" by Patrick P. Mercier et al., pp. 1679-1688, IEEE Journal of Solid-State Circuits, vol. 44, No. 6, Jun. 6, 2009.

"Argentum Accourtics Cables by Ultralink/XLO at CES 2009" by Ultralink/XLO Products, Inc., 2 pages, Jan. 14, 2009.

"Multitone Fast Frequency-Hopping Synthesizer for UWB Radio" by Kari Stadius et al., pp. 1633-1641, IEEE Transactions on Microwave Theory and Techniques, vol. 55, No. 8, Aug. 2007.

Elite SC-27 "7.1-Channel A/V Receiver Featuring ICEpower Class-D Amplification . . . " brochure, 2 pages, 2009 Pioneer Electronics U.S.A.

"Ultrawideband Radio Design: The Promise of High-Speed, Short-Range Wireless Connectivity" by Sumit Roy et al., pp. 295-311, Proceedings of the IEEE, vol. 92, No. 2, Feb. 2004.

Linksys by Cisco brochure entitled "Introducing Wireless Home Audio", 7 pages, date unknown.

Yamaha MusicCAST2 MCX-RC100 and MCX-A300/MCX-P200 Owner's Manual, 20 pages, 2009.

* cited by examiner

400

401

| Band# | f (MHz) |
|---|---|
| b1 | 3432 |
| b2 | 3960 |
| b3 | 4488 |
| b4 | 6600 |
| b5 | 7128 |
| b6 | 7656 |
| b7 | 8184 |
| b8 | 8712 |
| b9 | 9240 |
| b10 | 9768 |
| b11 | 10296 |

401A Frequency Plan A

| | logic_0 | logic_1 |
|---|---|---|
| hop_0 | b1 | b7 |
| hop_1 | b5 | b2 |
| hop_2 | b9 | b8 |
| hop_3 | b3 | b4 |

401B Frequency Plan B

| | logic_0 | logic_1 |
|---|---|---|
| hop_0 | b2 | b9 |
| hop_1 | b8 | b4 |
| hop_2 | b10 | b6 |
| hop_3 | b5 | b1 |

401C Frequency Plan C

| | logic_0 | logic_1 |
|---|---|---|
| hop_0 | b3 | b8 |
| hop_1 | b1 | b6 |
| hop_2 | b5 | b4 |
| hop_3 | b2 | b10 |

401D Frequency Plan D

| | logic_0 | logic_1 |
|---|---|---|
| hop_0 | b4 | b10 |
| hop_1 | b3 | b7 |
| hop_2 | b2 | b1 |
| hop_3 | b9 | b6 |

FIG. 4

| **Command** (**m_unit**[1:31]) | **message_field_1** (m_unit[32:79]) | **message_field_2** (m_unit[80:207]) | **message_field_3** (**m_unit**[208:255]) | **Description** |
|---|---|---|---|---|
| sync_to_CS | sync_data (driven by CS) | sync_data (driven by CS) | sync_data (driven by CS) | The CS broadcast this message for a fixed amount of time for the SPS to synchronize to the CS.<br>The CS may survey radio environment to select a frequency hopping sequence and the duty cycle in order to avoid interference of a nearby system.<br>The SPS has not been incorporated into any playback system will attempt to sync to the CS. |
| sync_to_SPS | Silent | sync_data (driven by SPS) | Silent | The function of this message is for the CS to synchronize to the SPS.<br>This type of message unit is only used for configuration and setup.<br>The communication is always point-to-point from the SPS.<br>The CS initiates this message and it drives the beacon and command field.<br>The transmitter of the CS turns silent until the next message unit.<br>The receiver of the CS will also try to synchronize to the "sync_data" driven by the SPS.<br>The CS will continue sending this message until it is synchronized to a SPS.<br>Only one SPS should be able to receive this message.<br>It is because only one SPS can be configured through the "configuration enable mechanism".<br>And during the setup, the CS only selects a single SPS for this communication link through the "set_SPS_sleep" and "set_SPS_awake" messages.<br>The active SPS always drive a predefined "sync" message upon receiving this message.<br>This communication mechanism can also allow the CS to measure the delay between the SPS. |

FIG. 9A

| | | | | |
|---|---|---|---|---|
| set_config_on | sync_data<br>(driven by CS) | sync_data<br>(driven by CS) | sync_data<br>(driven by CS) | Message to set the SPS into configuration state.<br>Assumed the configuration mechanism is enabled in only one SPS. |
| std_config_msg | Standard Configuration Message<br>(driven by CS) | Standard Configuration Message<br>(driven by CS) | Standard Configuration Message<br>(driven by CS) | The Standard Configuration Message of the SPS.<br>Important configuration Data:<br>* channel identification<br>* playback system ID<br>* A link list to enable the CS to address each SPS within the playback system.<br>* The co-ordinate of the SPS within the playback system |
| vsp_config_msg | Vendor Specific Configuration Message<br>(driven by CS) | Vendor Specific Configuration Message<br>(driven by CS) | Vendor Specific Configuration Message<br>(driven by CS) | The Vendor Specific Configuration Message.<br>Typical example, firmware update.<br>The message format, content and its driver software are defined by the SPS vendor completely |
| commit_config | sync_data<br>(driven by CS) | sync_data<br>(driven by CS) | sync_data<br>(driven by CS) | The message to set the SPS to commit the buffered configuration data into its non-volatile storage |
| commit_status_chk | Silent | commit status of configuration<br>(driven by SPS) | silent | The message used by the CS to poll the commit status of the SPS.<br>The CS should sync to the SPS using the "sync_to_SCS" message.<br>The SPS will send the commit status in the "message_field2" |
| config_done | sync_data<br>(driven by CS) | sync_data<br>(driven by CS) | sync_data<br>(driven by CS) | Message to set the SPS leave the configuration state. |
| set_SPS_sleep | sync_data<br>(driven by CS) | SPS_channel<br>(driven_by_CS) | sync_data<br>(driven by CS) | The message sent by the CS to set the SPS to sleep selectively.<br>Capability to set all the SPS to sleep with a single message. |

FIG. 9B

| | | | | |
|---|---|---|---|---|
| set_SPS_awake | sync_data<br>(driven by CS) | SPS_channel<br>(driven_by_CS) | sync_data<br>(driven by CS) | The message sent by the CS to awake the SPS for setup.<br>Since the CS will be assumed to have no knowledge to the SPS connected to this system. So it will always start with a SPS of the default playback channel. And the linked list established during configuration will guide the CS to traverse the setup path of all the SPS<br>Capability to wake up all the SPS within the same playback system. That is, they all shared the same Playback System Identification. This will also set the system into playback mode. |
| setup_msg_2CS | Silent | Setup data From SPS to CS<br>(driven by SPS) | silent | Setup message sent from the SPS to the CS during setup.<br>The CS should sync to SPS using the<br>"sync_to_SCS" message before sending these messages<br>The SPS will send the setup data in the "message_field2"<br>The setup data:<br>* The profile of the SPS. For examples, its performance, sampling rate, resolution, time required for its local processing. API version.<br>* The playback system ID.<br>* The channel ID of this SPS.<br>* The channel ID of the next SPS. Could be the last SPS in the system. |
| setup_msg_2SPS | Setup data from CS to SPS<br>(driven by CS) | Setup data from CS to SPS<br>(driven by CS) | Setup data from CS to SPS<br>(driven by CS) | Setup message sent from the CS to SPS during setup.<br>All message fields will be used for sending data:<br>The setup data:<br>• The sampling clock rate<br>• The resolution of the samples<br>• The timing (delay in sample clock) of the samples.<br>• The executable objects for decoding the playback messages |
| playback_msg | Playback Message<br>(driven by CS) | Playback Message<br>(driven by CS) | Playback Message<br>(driven by CS) | The content of the playback material.<br>The layer and format is totally defined by the software layer above the playback executable and playback messages. |

FIG. 9C

| | | | | |
|---|---|---|---|---|
| nop | sync_data<br>(driven by CS) | Playback system Identification and sync_data<br>(driven by CS) | sync_data<br>(driven by CS) | Message broadcasted occasionally by the CS to allow the SPS to continue to synchronized to the CS. This is necessary because the CS can be mobile. The playback system identification is included in this message to make sure the relevant SPS are addressed. |
| ctrl_msg | sync_data<br>(driven_by_CS) | Control message Including the Playback system Identification and the SPS identification<br>(driven by CS) | sync_data<br>(driven by CS) | Control message to control the volume, timing delay, and other operation of the playback system.<br>Standard control message:<br>*start of content<br>*end of content<br>*volume control.<br>*timing delay control.<br>*sleep<br>*shutdown.<br>Software defined control functions: |
| cs_handover | sync_data<br>(driven_by_CS) | sync_data<br>(driven_by_CS) | sync_data<br>(driven_by_CS) | Message unit indicating the current CS is going to hand over its role to the next CS.<br>This should be the last message unit sent by current active CS before it relinquishes its responsibility.<br>After the SPSs detect this message, it will:<br>1.) Sleep<br>2.) Restart the sync_to_CS process<br>A special sync_data pattern is used to ensure probability of decoding this message incorrectly is minimum |
| start_sample_clk | sample clock frequency | sync_data<br>(driven by CS) | sync_data<br>(driven by CS) | Message unit to start the generation of the sample clock.<br>Upon receiving this message, the SPS will generate the sample clock with the clock edge aligned to the next beacon of the message unit.<br>The frequency of the sample clock is specified in the first message field of the message unit.<br>The sample clock is generated digitally from the conductor clock of the SPS. |

FIG. 9D

COGNITIVE LOUDSPEAKER SYSTEM

RELATED APPLICATIONS

This application claims priority from U.S. Provisional Patent Application 61/330,640, entitled "Concept of Cognitive-Loudspeaker System", which was filed on May 3, 2010, and is incorporated by reference herein.

FIELD OF THE INVENTION

The present invention relates to a sound production system for digital audio sources.

RELATED ART

FIG. 1 is a block diagram of a conventional digital audio playback system 100, which includes a digital audio source 101, an audio processor 102, and loudspeakers 111-113. Digital audio source 101 provides a digital audio bit stream to audio processor 102. The digital audio bit stream can be transmitted, for example, over an HDMI cable or using a wireless transmission protocol (WiFi). The digital audio bit stream can be provided by an audio source, such as Internet radio, digital radio or a personal media device. The digital audio bit stream can alternately be provided by an audio-video source, such as streaming video from the Internet, blue-ray discs, DVDs or DVBs.

Audio processor 102 includes an audio decoder 120, which receives the digital audio bit stream from digital audio source 101. The digital audio bit stream is played back in multiple channels in order to re-create a three dimensional (3D) sound effect. Examples of multi-channel playback systems include conventional two channel stereo systems, 5.1 channel systems (e.g., for Dolby AC-3 coding) and Dolby Surround 7.1 channel systems. In these multi-channel systems, each channel is played back in a different spatial location.

The digital audio bit stream is typically encoded in a highly compressed bit stream. Most of the information for the various channels is coded as a single channel with some extra information in the digital bit stream in order to avoid the linear increment of the bit rate for each additional channel. Hence, audio decoder 120 is used to decode the digital audio bit stream to re-create each channel. Audio decoder 120 also generates an audio sample clock to synchronize each channel. The audio sample clock typically has a frequency of 44 kHz, based on an audio spectrum of 20-20 kHz. The audio quality and effect will suffer if the sample clock for each channel is out of synchronization.

Audio processor 102 also includes digital-to-analog (D/A) converters 121-123 for each channel. Each of the D/A converters 121-123 receives the decoded digital bit stream for the associated channel and the audio sample clock from the audio decoder 120. In response, each of the D/A converters 121-123 provides an analog output signal for the associated channel. Power amplifiers 131-133 receive the analog output signals from the D/A converters 121-123, respectively. In response, power amplifiers 131-133 drive amplified analog output signals to speakers 111-113, respectively, over speaker cables.

In a typical digital audio system (which implements a centralized audio processor model), audio decoder 120, D/A converters 121-123 and the power amplifiers 131-133 are included in the same box. Examples of this type of equipment include an audio/video (A/V) processor, media server client and Media Devices. In general, audio processor 102 is required to provide the required power amplification for all of the channels. As a result, audio processor 102 is a relatively expensive device. Moreover, audio processor 102 implements preset signal processing and decoding functions, which may limit the future expansion of this device. In addition, speaker wires are needed to connect the audio processor 102 to each of the associated loudspeakers 111-113. As the number of channels increases, so does the required number of speaker wires. Market research has shown that the routing of speaker wires is a major obstacle for the adoption of surround sound systems.

In an active loudspeaker model, the power amplifiers 131-133 are included in the same box as the loudspeakers 111-113, rather than in the audio processor 102. However, this model still exhibits the problems described above.

The sound quality of a loudspeaker is influenced many factors, including overall frequency response, number of drivers, cross-over network, accuracy and impedance of the drivers across the operating frequency range, enclosure characteristics, accuracy matching of the power amplification, loss at the speaker cables and the power amplifier. The traditional electro-mechanical methods for improving loudspeaker sound quality are very expensive. Examples include: providing a very high current and low distortion power amplifier for each audio channel (mono-block); separating the audio spectrum into a number of frequency bands with a highly optimized cross-over network, and using a highly optimized driver unit to drive each band separately; applying an extensive computer aided design (CAD) method to optimize the loudspeaker parameters, including frequency response, phase, coloration of the enclosure box and input impedance; using very expensive material to build the loudspeaker enclosure; and using very low loss speaker cable.

A typical 5.1 home theater system requires the connection of two pair of wires from the audio processor 102 to a pair of surround speakers in the back of the room. As described above, this creates a very significant inconvenience for adopting a surround sound system. One solution available to solve this problem is wireless speaker technology. Wireless loudspeakers use invisible radio waves in lieu of physical speaker cables to transport sound from the audio processor 102 at the front of the room to surround speakers at the rear of the room.

In this case, the audio processor 102 must include a wireless transmitter, undesirably increasing the cost and complexity of this device. A small power amplifier/RF receiver is typically placed near the rear of the room (e.g., under a couch), and speaker wires are run from this power amplifier/RF receiver to the surround speakers, a few feet away. Thus, speaker wires must still be used in this system. A subset of the audio channels (i.e., the audio channels to be played through the surround speakers) are transmitted through the wireless interface from the audio processor 102 to the remote power amplifier/RF receiver, and are played through the surround speakers. Note that by transmitting a subset of the audio channels wirelessly, while transmitting the remaining audio channels through speaker cables, the sound quality and the surround effect can be significantly compromised.

It would therefore be desirable to have an audio system that overcomes the above-described deficiencies of a conventional audio system.

SUMMARY

Accordingly, the present invention provides a cognitive loudspeaker system that includes an active control station that communicates wirelessly and bi-directionally with a plurality of sound production stations. The control station and the sound production stations are initially synchronized to a conductor clock. During a setup process, configuration information (including channel identification and processing delay) is transmitted from the sound production stations to the active control station. In response to the received configuration information, the active control station generates playback executables for each of the sound production stations. The active control station wirelessly transmits the playback executables to the sound production stations.

After the setup process is complete, the active control station wirelessly transmits digital audio information (which is received from a digital audio source) to the sound production stations. Within each sound production station, the previously received playback executable is used to control the decoding and processing of the received digital audio information. Each sound production station generates digital audio output samples in response to the received digital audio information (and the associated playback executable). The digital audio samples are converted to an analog output signal, which are amplified and played through a speaker.

In accordance with one embodiment of the present invention, the active control station establishes a virtual decoder within each of the sound production stations, which enables playback from various sources. Cross-over filtering, compensation and equalization can be independently implemented within each sound production station. The virtual decoder allows the cognitive loudspeaker system to be easily modified/updated to handle new coding protocols.

In accordance with another embodiment of the present invention, the active control station can be replaced by another control station using a handover process.

The present invention will be more fully understood in view of the following description and drawings.

BRIEF DESCRIPTION OF THE DRAWINGS

FIG. 4 is a block diagram illustrating a frequency plan implemented by the transceiver of FIG. 3 in accordance with one embodiment of the present invention.

FIGS. 9A, 9B, 9C and 9D form a table that defines a set of message units used to operate the cognitive loudspeaker system of FIG. 2 in accordance with one embodiment of the present invention.

DETAILED DESCRIPTION

In general, the present invention provides a cognitive loudspeaker system for playback from digital audio sources. The cognitive loudspeaker system includes an active control station (CS) and one or more sound production stations (SPSs), which include the loudspeakers of the system. The various components of the cognitive loudspeaker system communicate wirelessly via a synchronized ultra-wideband (UWB) interface. The active control station can be flexibly associated with the sound production stations. An inactive control station can be switched to become the active control station using a control station handover process, which is described in more detail below. The sound production stations are source coding neutral. That is, the active control station establishes a virtual decoder within each of the sound production stations, which enables playback from various sources. Cross-over filtering, compensation and equalization can be independently implemented within each sound production station. Equalization for loudspeaker placement and room acoustics can also be implemented by the cognitive loudspeaker system.

As described in more detail below, the cognitive loudspeaker system of the present invention includes: a system architecture, a wireless communication architecture, a framework of software components, a method of synchronizing a number of physically disjoined audio channels through a wireless interface, a method to allow component specific signal processing to be added to the audio playback signal processing, and a usage model for configuration, setup, playback, resource sharing and upgrade of a digital audio playback system.

Figure 1:
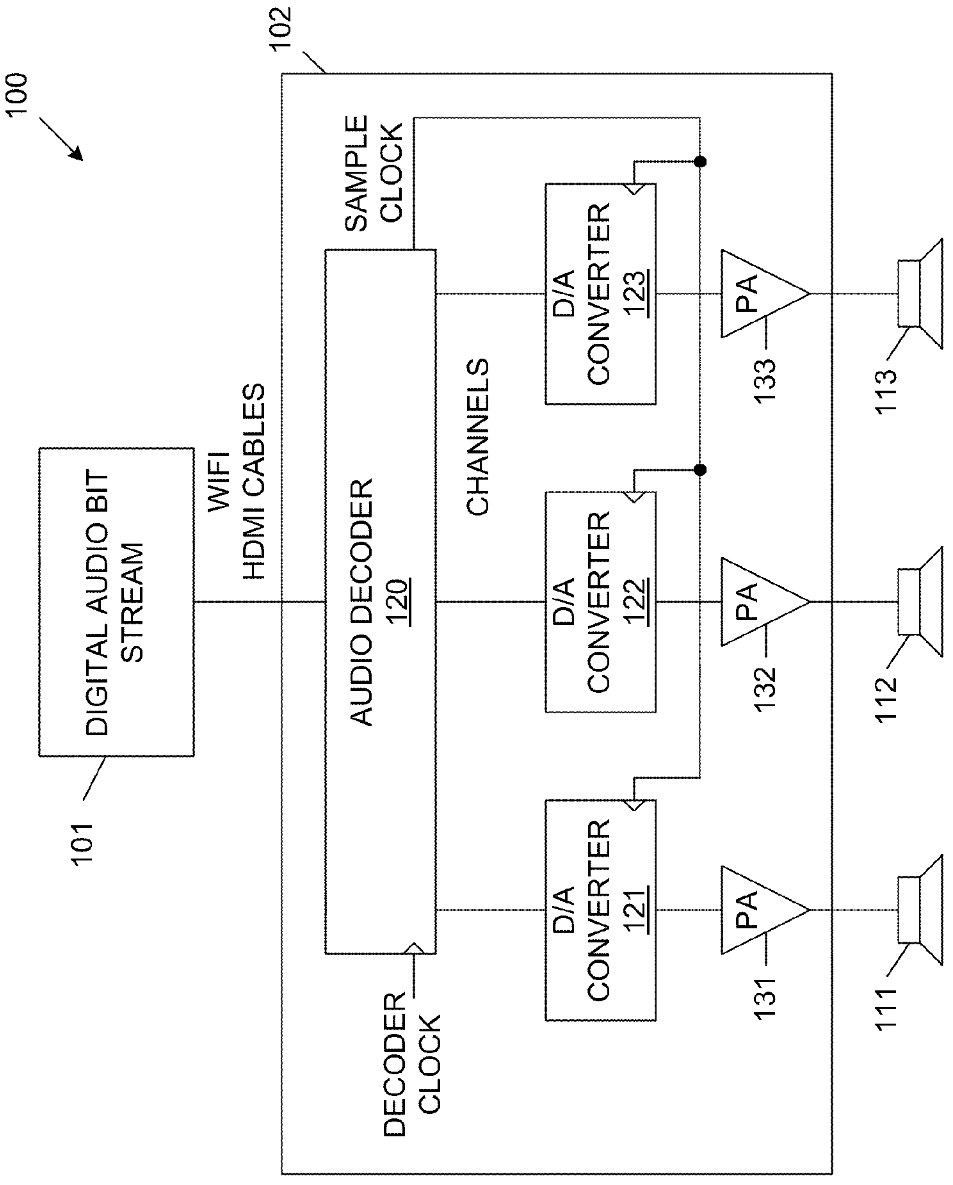
FIG. 1 (PRIOR ART)
FIG. 1 is a block diagram of a conventional digital audio playback system.
Figure 2:
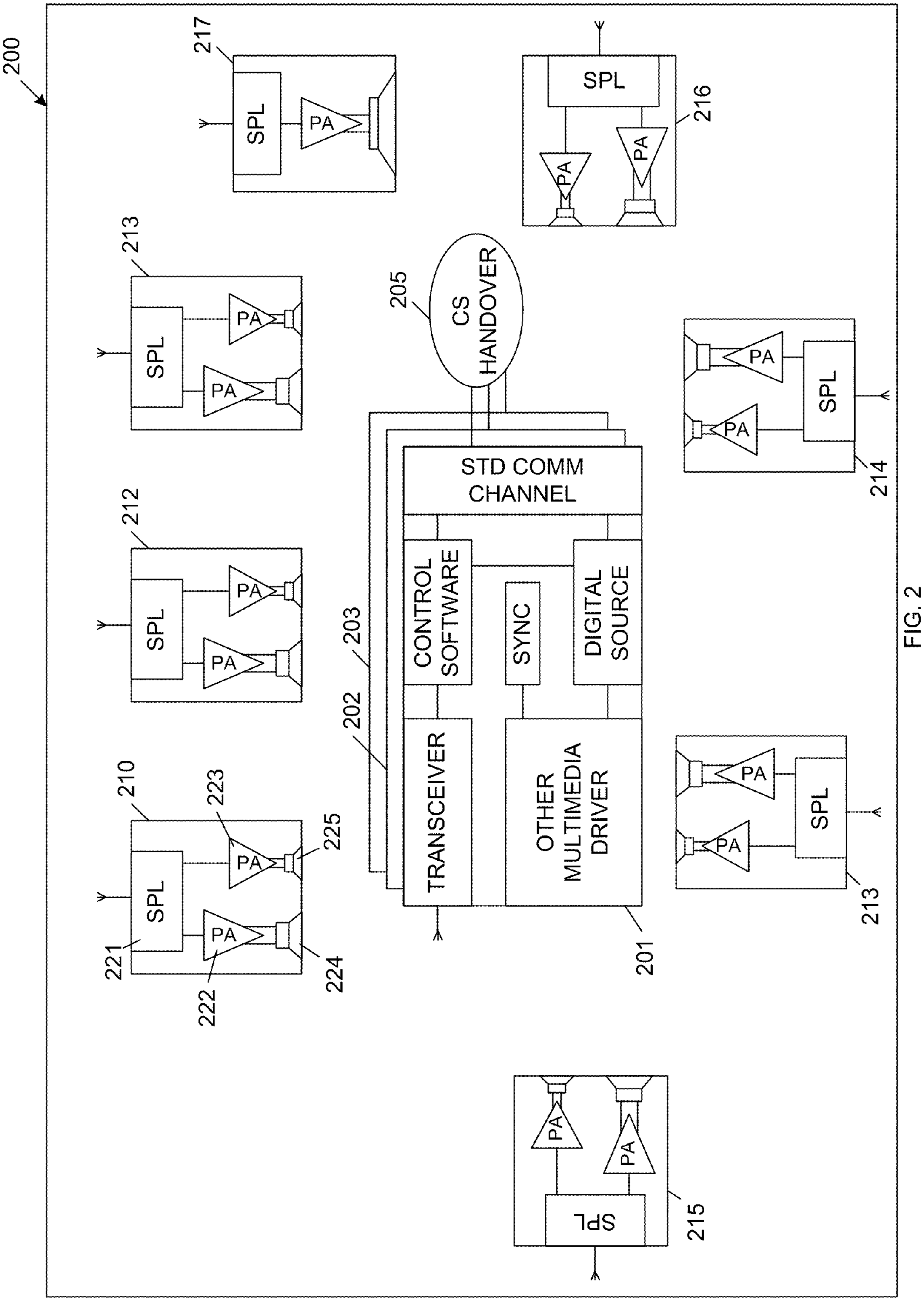
FIG. 2 is a block diagram of a cognitive loudspeaker system in accordance with one embodiment of the present invention.

FIG. 2 is a block diagram of a cognitive loudspeaker system (CLS) 200 in accordance with one embodiment of the present invention. CLS 200 includes control stations 201-203, control station handover logic 205, and a plurality of sound production stations 210-217. Although eight sound production stations 210-217 are illustrated (e.g., to implement 7.1 surround sound), it is understood that other numbers of sound production stations can be used in other embodiments. Each of the sound production stations 210-217 includes sound production logic (SPL), one or more power amplifiers (PA) and one or more loudspeakers. For example, sound production station 210 includes sound production logic 221, power amplifiers 222-223 and speakers 224-225. Although each of the sound production stations 210-216 includes two power amplifiers and two speakers, and the sound production station 217 includes one power amplifier and one speaker (e.g., a subwoofer), it is understood that sound production stations 210-217 can have other numbers of power amplifiers/speakers in other embodiments.

Normally, a loudspeaker will have a corresponding driver unit to handle specific frequencies, for example, 2-way or 3-way speakers. This is really limited by the physics of sound production. In accordance with one embodiment of the present invention, the sound production logic (SPL) illustrated by FIG. 2 operates as an efficient digital cross-over network. Most of the audio source is delivered in the frequency domain. Note that SPS 217 implements the '.1 channel' in the illustrated embodiment, thereby providing the LFE (low frequency effect) (e.g., a subwoofer box).

Only one control station (e.g., control station 201) is required to implement the playback of a digital audio stream. However, control station handover logic 205 allows playback to be easily switched between a plurality of control stations. In the embodiments described herein, control station 201 initially operates as the active control station. The other control stations 202-203 may replace control station 201 as the active control station through a handover process, which is described in more detail below.

Control stations 201-203 wirelessly communicate with sound production stations 210-217. In accordance with one embodiment, the radio characteristics of cognitive loudspeaker system 200 include the following: 100 Mb/sec (or less) for audio coding; a 5 meter range; available AC power (for the active control station 201 and the SPSs 210-217); low mobility; line of sight propagation (single room); low latency; precise multi-point synchronization within a limit; point-to-point duplex communication; single point to multiple points broadcasting; transient data (so that security is not an issue); a simple MAC layer for supporting the coexistence of multiple cognitive loudspeaker networks in dense apartment buildings; a hook for other media playback; and the ability to work in different spectrum requirements in different regions.

In accordance with one embodiment, wireless communication within cognitive loudspeaker system 200 is implemented using the ultra-wide band (UWB) frequency spectrum. UWB is an unlicensed wide frequency spectrum made available for commercial use by the FCC. By using the UWB frequency spectrum, the circuitry implemented by cognitive loudspeaker system 200 can be relatively simple for the bit rate, range and channel environment. More specifically, impulse radio transceivers can be implemented within the control stations 201-203 and sound production stations 210-217 to establish a scalable, very low jitter, low latency synchronized system, which is essential to multichannel audio playback. In alternate embodiments, different frequency spectrums can be used to implement wireless communication within cognitive loudspeaker system 200.

Figure 3:
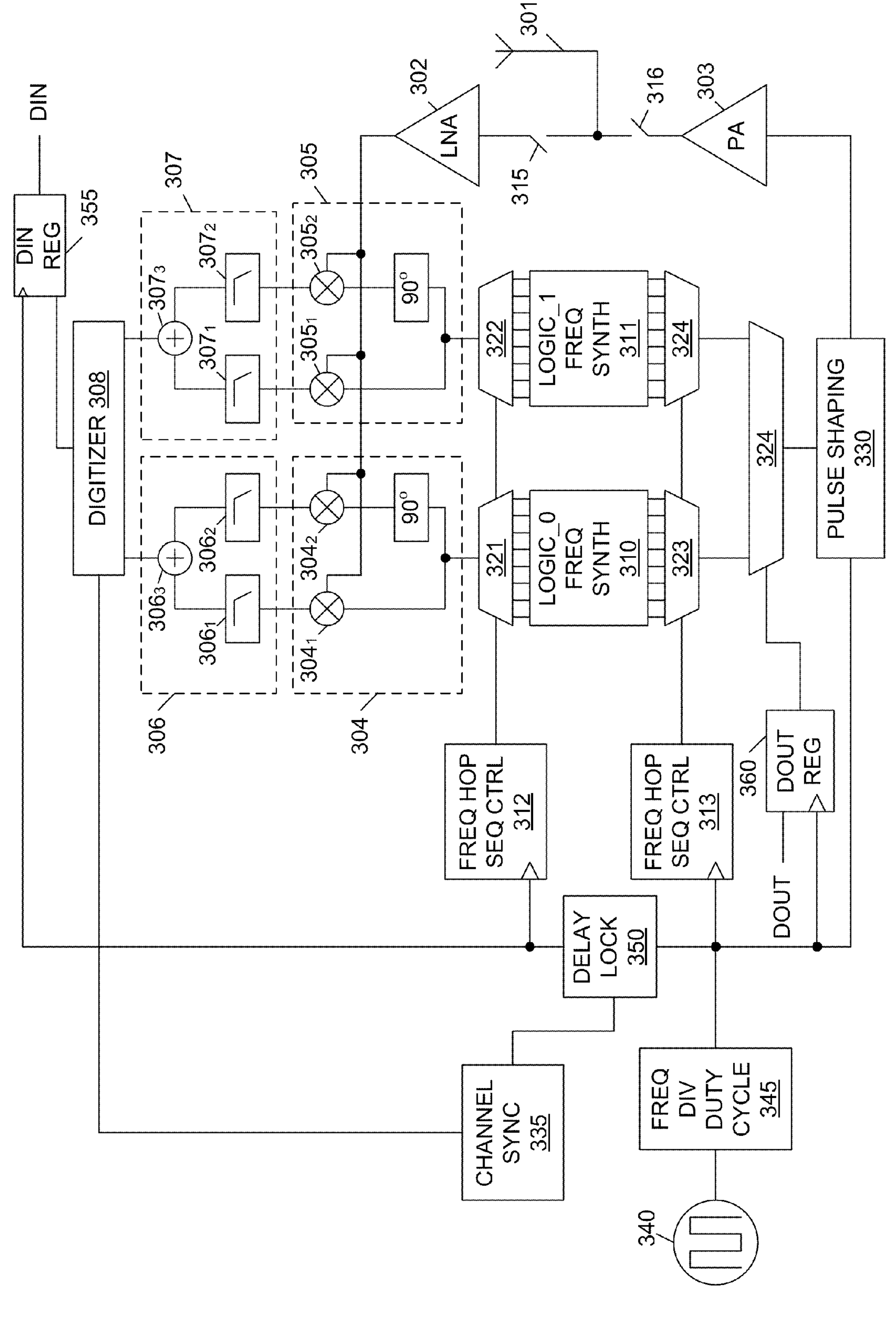
FIG. 3 is a block diagram of a transceiver used in the cognitive loudspeaker system of FIG. 2, in accordance with one embodiment of the present invention.

FIG. 3 is a block diagram of a UWB transceiver (CLS PHY) 300 used in the cognitive loudspeaker system 200 of FIG. 2, in accordance with one embodiment of the present invention. A transceiver identical to transceiver 300 is included in each of the control stations 201-203, as well as each of the sound production stations 210-217. Transceiver 300 includes antenna 301, low noise amplifier (LNA) 302, power amplifier (PA) 303, and signal mixer circuits 304-305, which need to operate in the UWB frequency range. Transceiver 300 also includes data recovery circuits 306-307, digitizer 308, frequency synthesizers 310-311, frequency hopping sequence control logic blocks 312-313, switches 315-316, multiplexers 321-325, pulse shaping logic 330, channel synchronization circuit 335, clock generation circuit 340, frequency divider/duty cycle controller 345, delay lock 350, data input register 355 and data output register 360.

Clock generation circuit 340 generates a conductor clock signal that enables cognitive loudspeaker system 200 to operate synchronously. In the described embodiments, the conductor clock signal has a frequency of 250 MHz, although other clock frequencies can be implemented in other embodiments. Frequency divider/duty cycle control 345 performs a division function on the conductor clock and controls the duty cycle of the divided conductor clock to generate a system clock signal.

The rationale for dividing the 250 MHz conductor clock signal is that the maximum bit rate provided by this clock signal is 250 Mb/s. However, the bit rate for audio data is much lower than this 250 Mb/s. By reducing the duty cycle of the conductor clock, the chance of inter-symbol interference (ISI) is reduced in the case where there are other nearby CLS systems (e.g., in a dense urban area). The available bandwidth can also be used to transmit other data, such as a video stream. Note that there is a trade-off between the bit rate and ISI.

The system clock signal effectively enables data transmission to occur during a portion of the conductor clock signal, every N cycles of the conductor clock signal (wherein N is an integer greater than one). This allows multiple cognitive loudspeaker systems to operate in close proximity to one another, as different systems can transmit data during different cycles of the conductor clock signal. This also reduces ISI.

One major factor relied upon to synchronize all of the audio channels is the simple pulse radio. There is no signal processing to try to correct the interference from the previous signals. Frequency hopping eliminates most of the ISI. But reducing the duty cycle will also greatly reduce the possibility of interference from its own transmission as well as other CLS system nearby.

The system clock signal controls the transmission functions of transceiver 300, including the latching of output data values into data output register 360, the transitioning of frequency hopping sequence control logic 313, the routing of output data through pulse shaping logic 330, and the operation of output switch 316. Pulse shaping logic 330 is used to cause the transmitted signal to occupy 500 MHz spectrum in accordance with the requirements of the UWB radio specification.

Delay lock circuit 350 introduces a delay to the system clock signal to generate a delayed system clock signal. This delayed system clock signal provides an offset between the transmit and receive functions implemented by transceiver 300. This delay is selected to ensure that the conductor clock in the transmitter circuit is synchronized with the conductor clock in the receiver circuit. The delayed system clock signal controls the receiving functions of transceiver 300, including the latching of input data values into data input register 355, the transitioning of frequency hopping sequence control logic 312 and the operation of input switch 315. As described in more detail below, channel synchronization logic 335 controls the delay introduced by delay lock circuit 350.

In general, the clock system is synchronized such that the receiver circuit can receive data from the transmitter correctly. All of the SPSs 210-217 receive the same playback stream, synchronously. As described in more detail below, sample clocks in all of the SPSs are started synchronously in response to a message unit transmitted by the active control station 201. Timing information transmitted by the active control station 201 prevents drifting of the sample clocks within the SPSs 210-217. As described in more detail below, each of the SPSs 210-217 includes a playback processor, which operates in response to its own clock system.

Frequency synthesizers 310-311 generate all of the frequency tones for the frequency plan implemented by transceiver 300. In the described embodiments, each of the frequency synthesizers 310 and 311 is capable of generating eight frequency tones. Frequency hopping sequence control logic 312-313 include state machines that control the sequence of the frequency hopping. More specifically, frequency hopping sequence control logic 313 controls multiplexers 323 and 324, such that multiplexer 323 routes one of the frequency tones generated by frequency synthesizer 310 to multiplexer 325, and multiplexer 324 routes one of the frequency tones generated by frequency synthesizer 311 to multiplexer 325. In general, the frequency tones routed by multiplexers 323 and 324 represent logic '0' and logic '1' data values, respectively.

Multiplexer 325 is controlled by the data output value latched in data output register 360. If the data output value has a logic '0' value, multiplexer 325 routes the frequency tone provided by multiplexer 323 (frequency synthesizer 310). Conversely, if the data output value has a logic '1' value, multiplexer 325 routes the frequency tone provided by multiplexer 324 (i.e., frequency synthesizer 311). Pulse shaping logic 330 shapes the frequency tone routed by multiplexer 325 to meet FCC requirements. More specifically, pulse shaping logic 325 generates a frequency tone having a duration (pulse width) specified by the system clock signal. The pulsed frequency tone provided by pulse shaping logic 330 is provided to power amplifier 303. Output switch 316 is closed to drive the amplified pulsed frequency tone to antenna 301, thereby causing antenna 301 to transmit a wireless UWB signal that represents a logic '0' or a logic '1' data value. Note that input switch 315 is open while output switch 316 is closed. Switches 315-316 operate in response to message units (described below) that specify whether transceiver 300 is operating as a transmitter (output switch 316 closed) or a receiver (input switch 315 closed).

On the receiver side of transceiver 300, an input frequency tone is received by antenna 301 and is routed through input switch 315 and low noise amplifier 302 to signal mixer circuits 304 and 305. Signal mixer circuits 304 and 305 include signal mixers $304_1$-$304_2$ and $305_1$-$305_2$, respectively, which receive the input frequency tone from low noise amplifier 302.

Frequency hopping sequence control logic 312 controls multiplexers 321 and 322, such that multiplexer 321 routes one of the frequency tones generated by frequency synthesizer 310 to signal mixer circuit 304, and multiplexer 322 routes one of the frequency tones generated by frequency synthesizer 311 to signal mixer circuit 305. The frequency tone routed by multiplexer 321 has the same frequency as a frequency tone having a logic '0' value received by antenna 301, while the frequency tone routed by multiplexer 322 has the same frequency as a frequency tone having a logic '1' value received by antenna 301. The frequency tone routed by multiplexer 321 is provided to signal mixer $304_1$. The frequency tone routed by multiplexer 321 is also shifted (delayed) by 90 degrees, and the shifted frequency tone is applied to signal mixer $304_2$. Similarly, the frequency tone routed by multiplexer 322 is provided to signal mixer $305_1$. The frequency tone routed by multiplexer 322 is also shifted by 90 degrees, and the shifted frequency tone is applied to signal mixer $305_2$.

The outputs of signal mixers $304_1$ and $304_2$ are provided to integrators $306_1$ and $306_2$, respectively, within data recovery circuit 306. Similarly, the outputs of signal mixers $305_1$ and $305_2$ are provided to integrators $307_1$ and $307_2$, respectively, within data recovery circuit 307. The outputs of integrators $306_1$ and $306_2$ are provided to adder $306_3$ within data recovery circuit 306, and the outputs of integrators $307_1$ and $307_2$ are provided to adder $307_3$ within data recovery circuit 307. If the frequency tone received by antenna 301 matches the frequency tone routed by multiplexer 321, the output of adder $306_3$ will indicate this match by providing an output signal having a sufficient amount of energy to be detected by digitizer 308. Conversely, if the frequency tone received by antenna 301 matches the frequency tone routed by multiplexer 322, the output of adder $307_3$ will indicate this match by providing an output signal having a sufficient amount of energy to be detected by digitizer 308.

If neither the output of adder $306_3$ nor the output of adder $307_3$ has enough energy to be detected by digitizer 308, then the receiver circuitry is not properly synchronized with the associated transmitter circuitry. If both the output of adder $306_3$ and the output of adder $307_3$ have enough energy to be detected by digitizer 308, then an error condition (which may be caused by interference) is indicated.

The outputs of adders $306_3$ and $307_3$ are provided to digitizer 308. Digitizer 308 provides a logic '0' value to data input register 355 if the input frequency tone received by antenna 301 matches the frequency tone routed by multiplexer 321 (i.e., energy is detected in the output signal provided by adder $306_3$). Conversely, digitizer 308 provides a logic '1' value to data input register 355 if the input tone received by antenna 301 matches the frequency tone routed by multiplexer 322 (i.e., energy is detected in the output signal provided by adder $307_3$). The data value provided by digitizer 308 is latched into data input register 355 in response to the delayed system clock signal. The data values detected by digitizer 308 are also provided to channel synchronization logic 335, which in turn controls delay lock 350 to introduce the proper delay to the system clock signal, thereby generating the delayed system clock signal.

In accordance with one embodiment, there is synchronization data ('sync_data') embedded in the received data (i.e., message unit). This sync_data is a code sequence known to both the transmitter circuit and the receiver circuit. The transmitter circuit will transmit this code sequence when sending the message unit, and the receiver circuit will adjust the delay of the delayed system clock signal so that the received data is aligned to the sync_data. Both the transmitter and the receiver expect a bit of data to be transmitted within a fixed time interval, so the receiver circuit adjusts the delay of the delayed system clock signal such that the digitizer 308 can detect the maximum energy in the signals provided by data recovery circuits 306 and 307.

In accordance with one embodiment, impulse transceiver 300 implements a complementary frequency hopping pulse modulation (CFHPM) scheme. The timing of the frequency hopping is synchronized to a division of the 250 MHz conductor clock signal. Different sets of complementary frequency hopping plans are used to represent logic '0' and logic '1' values. Logic '0' and logic '1' values are modulated by the associated frequency hopping plans. The transmitter side of the transceiver 300 will transmit a modulated pulse based on the logic state of an associated data bit. The receiver side of the transceiver 300 needs to synchronize to the conductor clock signal and the frequency hopping sequence of the transmitter before data can be received. As described in more detail below, this synchronization on the receiver side is accomplished by locking to a beacon and a "sync_data" pattern within a message unit sent by the transmitter. Co-existence with other cognitive loudspeaker systems in close proximity is possible by dividing the conductor clock and providing multiple frequency hopping sequence plans.

FIG. 4 is a block diagram illustrating a frequency plan 400 implemented by transceiver 300 in accordance with one embodiment of the present invention. Frequency plan 400 includes frequency table 401 and frequency plans 401A-401D. As illustrated by frequency table 401, eleven frequency tones b1-b11 are available to implement the frequency plans 401A-401D. Frequency synthesizer 310 is capable of generating frequency tones b1, b2, b3, b4, b5, b8, b9 and b10. Frequency synthesizer is capable of generating frequency tones b1, b2, b4, b6, b7, b8, b9, b10 and b11. Frequency tones b1-b11 vary in frequency from 3432 MHz to 10296 MHz, as illustrated by frequency table 401.

Frequency plans 401A-401D define different manners of representing logic '0' and logic '1' values using the frequency tones b1-b11. The frequency tone designations change (i.e., 'hop') for each successive bit transmitted/received. Thus, a first bit is encoded using a first frequency designation 'hop_0', a second bit is encoded using a second frequency designation 'hop_1', a third bit is encoded using a third frequency designation 'hop_2' and a fourth bit is encoded using a fourth frequency designation 'hop_3'. This pattern is repeated for subsequent bits, such that a fifth bit is encoded using the first frequency designation 'hop_0', a sixth bit is encoded using the second frequency designation 'hop_1', and so on.

For example, when using frequency plan 401A, a first bit is encoded using 'hop_0' of table 401A, whereby a logic '0' value is represented by frequency tone b1 (i.e., a 3432 MHz signal) and a logic '1' value is represented by frequency tone b7 (i.e., a 8184 MHz signal). Thus, frequency hopping sequence control logic 313 causes multiplexers 323 and 324 to route frequency tones b1 and b7, respectively, when encoding using 'hop_0' of table 401A. (Similarly, frequency hopping sequence control logic 312 causes multiplexers 321 and 322 to route frequency tones b1 and b7, respectively, when encoding using 'hop_0' of table 401A.) A second bit is encoded using 'hop_1' of table 401A, whereby a logic '0' value is represented by frequency tone b5 (i.e., a 7128 MHz signal) and a logic '1' value is represented by frequency tone b2 (i.e., a 3960 MHz signal). A third bit is encoded using 'hop_2' of table 401A, whereby a logic '0' value is represented by frequency tone b9 (i.e., a 9240 MHz signal) and a logic '1' value is represented by frequency tone b8 (i.e., a 8712 MHz signal). A fourth is encoded using 'hop_3' of table 401A, whereby a logic '0' value is represented by frequency tone b3 (i.e., a 4488 MHz signal) and a logic '1' value is represented by frequency tone b4 (i.e., a 6600 MHz signal). Note that for frequency plan 401A, frequency synthesizer 310 is only required to generate frequency tones b1, b5, b9 and b3, and frequency synthesizer 311 is only required to generate frequency tones b7, b2, b8 and b4.

To send a data stream of '01110100' using frequency plan 401A, the following sequence of frequency tones would be transmitted from frequency synthesizers 310 and 311 to antenna 301: b1, b2, b8, b4, b1, b2, b9 and b3. To transmit the same data stream using frequency plan 401B, the following sequence of frequency tones would be transmitted: b2, b4, b6, b1, b2, b4, b10 and b5. To transmit the same data stream using frequency plan 401C, the following sequence of frequency tones would be transmitted: b3, b6, b4, b10, b3, b6, b5 and b2. To transmit the same data stream using frequency plan 401D, the following sequence of frequency tones would be transmitted: b4, b7, b1, b6, b4, b7, b2 and b9.

The different frequency plans 401A-401D enable different cognitive loudspeaker systems to coexist in close proximity (e.g., in a dense apartment complex). During the setup process (described below), the active control station 201 will detect the existence of any other cognitive loudspeaker networks. In response, the active control station 201 will select an unused frequency plan and adjust the phase/duty cycle of the conductor clock signal until the control station can successfully communicate with all of the sound production stations 210-217 within the system 200. As described below, each component within the cognitive loudspeaker system 200 will share a common network ID, which is established during a configuration process. Each component will ignore data transmitted by cognitive loudspeaker systems having a different network ID.

Figure 5:
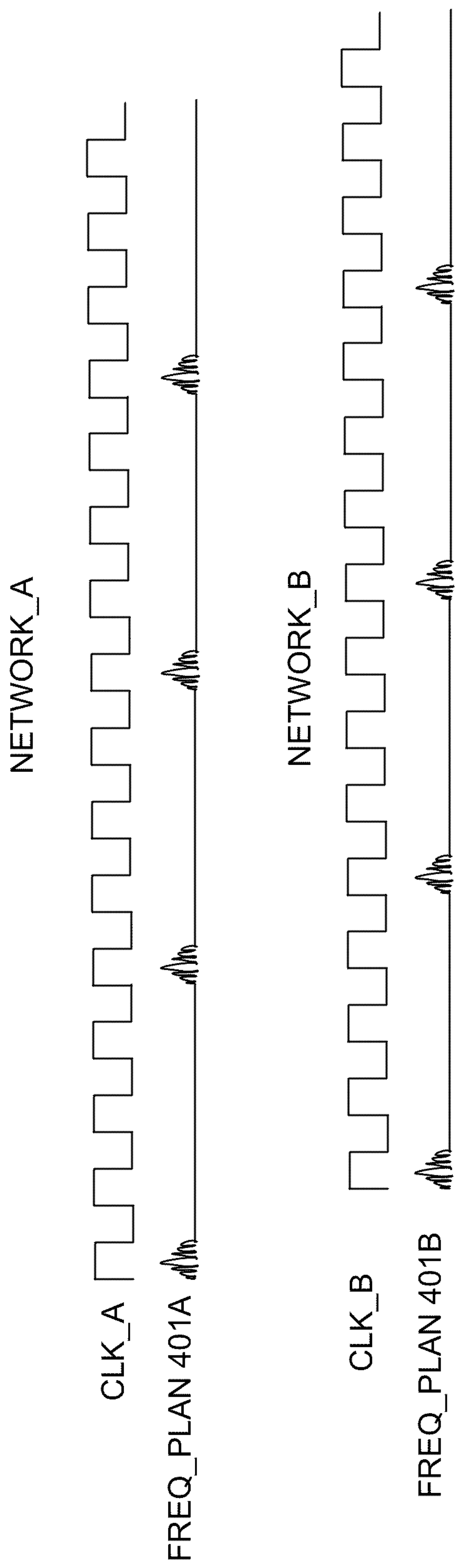
FIG. 5 is a waveform diagram illustrating a first conductor clock signal associated with a first cognitive loudspeaker system, and a second conductor clock signal associated with a second cognitive loudspeaker system in accordance with one embodiment of the present invention.

FIG. 5 illustrates a first conductor clock signal CLK_A associated with a first cognitive loudspeaker system (Network_A), and a second conductor clock signal CLK_B associated with a second cognitive loudspeaker system (Network_B). The first cognitive loudspeaker system (Network_A) implements the frequency plan 401A, while the second cognitive loudspeaker system (Network_B) implements the frequency plan 401B. Moreover, the conductor clock signal CLK_B is adjusted to be out of phase with respect to the conductor clock signal CLK_A, such that the first cognitive loudspeaker system (Network_A) is not actively transmitting during the same time as the second cognitive loudspeaker system (Network_B). In the example of FIG. 5, the duty cycle is selected such that data is transmitted only during every fifth cycle of the conductor clock signal.

Figure 6:
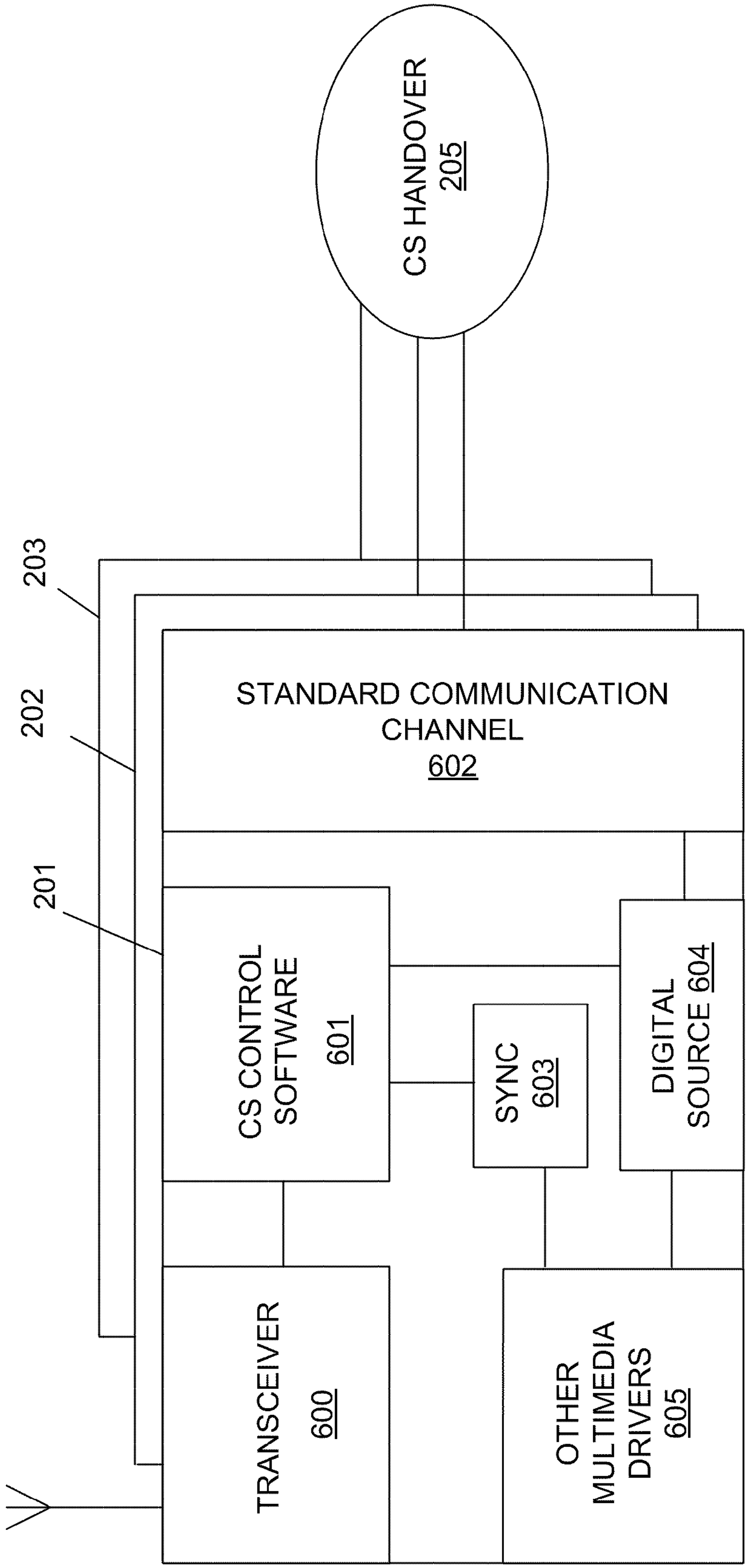
FIG. 6 is a block diagram illustrating an active control station of the cognitive loudspeaker system of FIG. 2 in accordance with one embodiment of the present invention.

FIG. 6 is a block diagram illustrating the active control station 201 in accordance with one embodiment of the present invention. Control station 201 includes transceiver 600, which is identical to transceiver 300 of FIG. 3. Control station 201 also includes control software 601, standard communication channel 602, synchronization logic 603, digital source 604 and other multimedia drivers 605.

Standard communication channel 602 can be, for example, a standard wireless communication link such as WiFi or Bluetooth. Standard communication channel 602 is used to implement the control station handover process, which is described in more detail below. In general, the control station handover process allows control of the cognitive loudspeaker system 200 to be transferred from one control station (e.g., control station 201) to another control station (e.g., control station 202). Standard communication channel 602 can also be used as a communication link for playback sources.

Transceiver 600 operates as a playback synchronization master, and also functions as a communication link between the active control station 201 and the sound production stations 210-217. Transceiver 600 can also function as a communication link to other control stations 202-203. As described in more detail below, transceiver 600 transmits configuration data, a playback executable and a digital playback stream to sound production stations 210-217. Transceiver 600 also receives information from the sound production stations 210-217 during a setup process.

Digital source 604 is a playback source, which can include, for example, audio streaming from the Internet, archived music from a home network or from a legacy digital DISC player. The format of digital source 604 can be, for example, MP3, AC3, AAC, 24b/192 kHz LPCM or FLAC. Digital source 604 is able to play all possible source formats through virtual coder software, which is described in more detail below.

Control station control software 601 implements a configuration routine, compiles a playback executable, implements a setup routine, broadcasts a digital playback stream, controls the control station handover routine, and implements playback control in a manner described in more detail below.

Multimedia drivers 605 allow the cognitive loudspeaker concept to be applied to the playback of other media data, such as a video stream. Synchronization circuitry 603 is provided for use with multimedia drivers 605. It is possible for the cognitive loudspeaker system 200 to be used in conjunction with other media (most likely, a video stream). However, there is some delay incurred in order to accommodate the signal processing time and placement delay for each audio channel. The active control station 201 can synchronize all of the audio channels by making all the audio channels wait for the channel with the longest delay. This is accomplished by delaying the output of each channel accordingly. Because the active control station 201 has the information of how much delay is imposed on the audio source, it also needs to add this delay to other content stream (e.g., the video stream) so the playback content is synchronized. Synchronization circuitry 603 introduces this necessary delay to the other content stream.

Any of the control stations 201-203 can drive the SPSs 210-217. However, only one of these control stations 201-203 can be active at a given time. The coordination of the control stations 201-203 is conducted through the CS handover process 205, which is described in more detail below.

The active control station 201 can be, for example, a television set, an A/V processor (wherein no power amplification or physical connections are required), a set-top box, a personal computer, a networked home entertainment client or a personal entertainment device.

The general functions implemented by active control station 201 include the following. Control station 201 may control the configuration and setup of the SPSs 210-217. Control station 201 may acquire, transfer and release the role of "active control station" thru the CS handover process. Control station 201 becomes the synchronization point of the playback system using the conductor clock signal. Control station 201 relays the digital playback data to the SPSs 210-217. Control station 201 performs playback format transcoding. Control station 201 also controls various basic operating functions of the playback system including source selection, volume, equalization, stop, pause, fast forward, power up and shut down.

Figure 7:
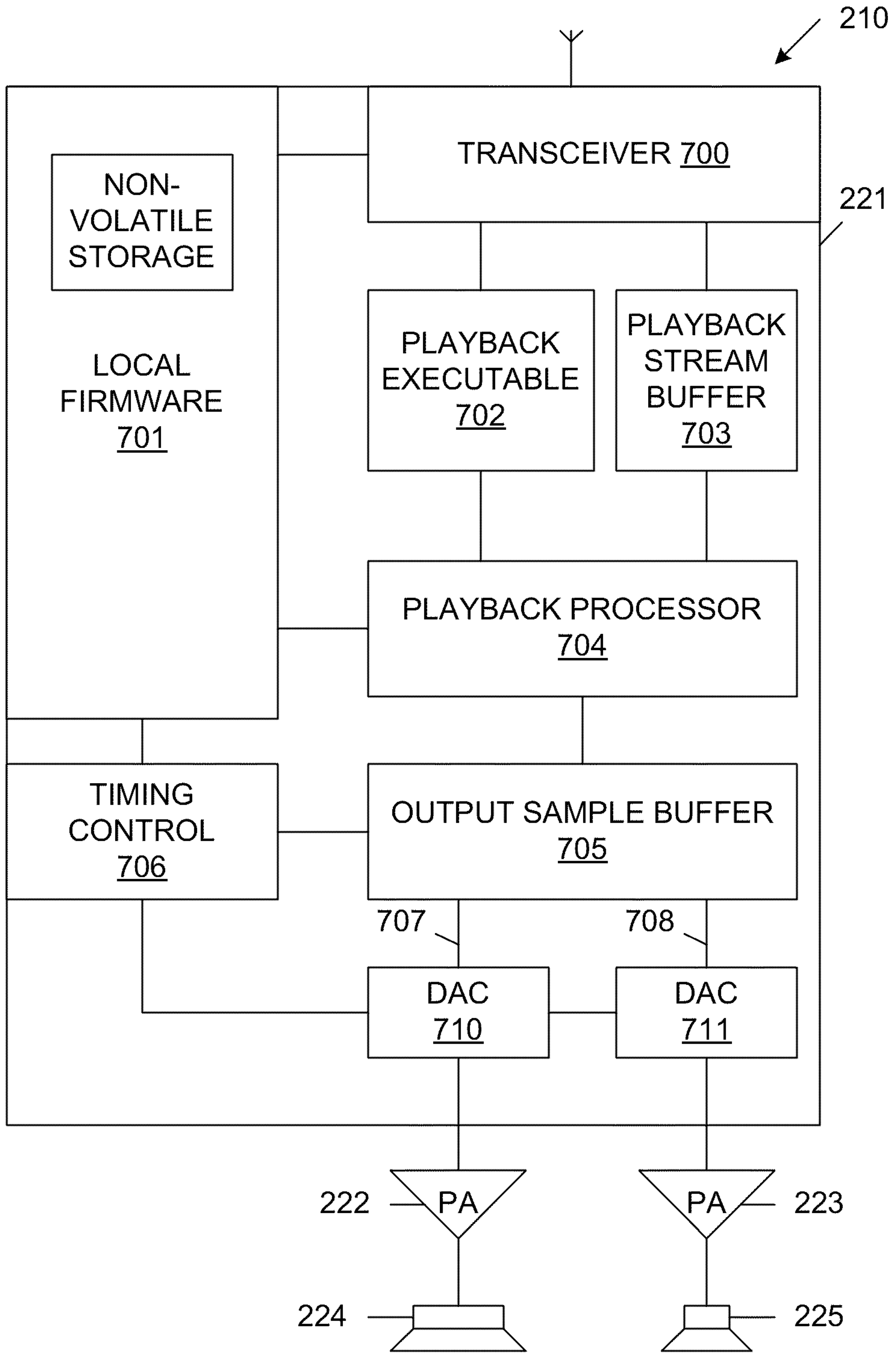
FIG. 7 is a block diagram of sound production station of the cognitive loudspeaker system of FIG. 2 in accordance with one embodiment of the present invention.

FIG. 7 is a block diagram of SPS 210, in accordance with one embodiment of the present invention. SPSs 211-217 are substantially identical to SPS 210 in the described embodiments. SPS 210 includes sound production logic (SPL) 221, power amplifiers 222 and 223 and loudspeakers 224-225. SPL 221 includes transceiver 700, which is identical to the transceiver 300 described above in connection with FIG. 3. SPL 221 also includes local firmware 701, playback executable 702, playback stream buffer 703, playback processor 704, output sample buffer 705, playback timing control 706, sample output channels 707-708 and digital-to-analog converters 710-711.

In accordance with the described example, SPS 210 is associated with loudspeakers 224-225 in a single enclosure. Multiple power amplifiers 222-223 are provided for different frequency ranges. For example, power amplifier 222 may drive low frequency analog signals, while power amplifier 223 may drive high frequency analog signals. As described below, SPL 221 provides non-volatile storage for channel identification, placement information, unit characteristics (equalization requirements, computing capabilities, etc.), real time operating system (RTOS), API library and local signal processing code. In addition, SPL 221 synchronizes to the conductor clock of the active control station 201 and accepts configuration information from the active control station 201. SPL 221 also communicates with the active control station 201 to setup the playback system, provides storage for the playback stream broadcast from the active control station 201, and decodes the playback stream with instruction from the playback executable 702. SPL 221 also performs local signal processing for crossover, compensation and equalization, buffers the output samples, generates synchronized output samples, performs digital-to-analog conversion of the output samples, and drives the analog signals to the power amplifiers 222-223.

In general, transceiver 700 operates as a communication link to the active control station 201. Transceiver 700 is phase locked to the conductor clock signal of the active control station 201, such that SPS 210 operates as a playback synchronization slave. Transceiver 700 receives configuration data, playback executable information, and/or a digital playback stream from the active control station 201. Transceiver 700 also transmits information to the active control station 201 during the configuration and setup routines, which are described in more detail below.

Firmware 701 includes non-volatile executable and information of SPS 210. In accordance with one embodiment, firmware 701 includes a standardized portion, a manufacturer defined portion and a user defined portion.

The standardized portion of firmware 701 includes a real time operating system (RTOS) to control the operation of the SPS 210, and an application program interface(API), which is used to compile the playback executable 702. It is possible that the SPS 210 can be built upon different instruction set architecture (ISA), so having a standardized API would remove the dependence on any particular architecture. The playback executable 702 is highly efficient to minimize the associated storage requirement and minimize the time required to execute the setup routine.

The manufacturer defined portion of firmware 701 includes an executable for the SPS specific signal processing, and includes means for maintaining the following information: the cycle time of the playback processor 704, the number of cycles consumed by the API, the number of cycles consumed by the SPS specific signal processing, and the frequency range of the SPS (e.g., the SPS may be a subwoofer).

The user defined portion of firmware 701 includes playback channel identification, placement information of the SPS 210, and room acoustic information. This information is forwarded to the active control station 201 during the setup routine when the cognitive loudspeaker system 200 is powered up. This information is also passed to the next active control station during the control station handover process 205.

The firmware 701 can be updated thru the configuration routine implemented by the active control station 201, which is described in more detail below.

Playback executable 702 is a software object used by the SPS 210 to decode the playback stream received from the active control station 201. Playback executable 702 is compiled by the active control station 201 based on the following inputs (which are received from each of the SPSs 210-217): the decoding algorithm, channel ownership, the capability of each SPS (e.g., a 192 kHz sampling rate for the main stereo channels and a 48 kHz sampling rate for other channels), the sensitivity of each channel, the equalization requirement for room acoustics, the delay requirement for system level synchronization, and the entry point for the local signal processing (i.e., where the local signal processing program is to be integrated into the playback executable 702, or the local signal processing API). In an alternate embodiment, the non-volatile storage of the SPS 210 can be used to store a common playback executable, which can be loaded into playback executable 702 during the setup process, thereby speeding up the setup process.

The playback executable 702 for each SPS can be different. The active control station 201 downloads the playback executable 702 to each SPS during the setup process (described below). Each SPS may execute its own local signal processing to the output samples. SPS 210 reports the time required to perform its signal processing to the active control station 201 during the setup process. The active control station 201 gathers the timing requirements for signal processing and calculates the delay required to be added within each SPS so that all of the playback channels are synchronized. The active control station 201 will send the delay requirement to each SPS as part of the setup process.

The cognitive loudspeaker system 200 does not define syntax of the playback stream. The active control station 201 (which transmits the playback stream) must compile a playback executable 702 that can be executed by the SPS in order to decode the playback stream, and complete the computation for each sample in a timely manner. One form of the playback executable 702 is a virtual decoder. Cognitive loudspeaker system 200 is a highly programmable system. It is possible that each control station designer will develop their own playback executable and playback stream in order differentiate their product. On the other hand, some control station designers may develop a universal playback executable and playback stream format. With this setup, any digital audio format can be played in this system with just a software translation. This is somewhat similar to software virtualization.

There are several reasons for doing this. First, users do not need to worry about the format of the content, or worry that the devices they own will become obsolete. In addition, the cost of selling a software coder (IP licensing) is much cheaper than selling a hardware coder.

The active control station 201 needs to setup the playback executable 702 and synchronize all of the SPSs 210-217 before transmitting the playback stream. Only a single copy of the playback stream is broadcast from the active control station 201. The playback stream is received by the transceiver 700, and is transferred to the playback stream buffer 703. The playback stream buffer 703 then transmits the playback stream to the playback processor 704. The playback processor 704 within each of the SPSs 210-217 executes its own version of the playback executable 702 and local signal processing code to process the playback stream received from the playback stream buffer 703. The playback processor 704 converts the playback stream to digital output samples that are stored in the output sample buffer 705. Playback processor 704 also executes the simple RTOS to support the following SPS operations (in response to information transmitted by the active control station 201): power on, sleep, shutdown, synchronization to the active CS, setup routine, configuration routine, playback stream processing and playback control.

Possible architectures for the playback processor 704 include: a RISC core with multiple-add pipeline, and Harvard architecture with separate RAM for instructions and data. In accordance with one embodiment, playback processor 704 operates with a 250 MHz-2 GHz cycle time, and runs asynchronous to the conductor clock and a sampling clock.

Output sample buffer 705 temporarily stores the output samples provided by playback processor 704, so that playback from all the channels (e.g., SPSs 210-217) can be synchronized. Playback processor 704 writes to the output sample buffer 705 in the clock domain of playback processor 704. Output sample buffer 705 is read to the output channels 707-708 at a sample clock frequency. More than one sample can be written or read at each sampling point in order to realize a digital cross-over function. The sample output channels 707-708 are configurable. The sample output channels 707-708 drive the D/A converters 710-711. In accordance with one embodiment, output sample buffer 705 can be implemented by a field programmable gate array (FPGA) device.

D/A converters 710-711 perform the only digital-to-analog conversion within the cognitive loudspeaker system 200. D/A converters 710-711 can be implemented in various manners to achieve cost/performance differentiation. For example, an embedded sole output channel (D/A converter) with a low sampling clock frequency can be used for a low cost single chip SPS implementation. Alternately, a high resolution, high sampling rate and low noise D/A converter per driver unit can be used for high end loudspeakers.

Power amplifiers 222-223 are coupled to the analog outputs of D/A converters 710-711, respectively. Power amplifiers 222-223 are the only analog circuitry in the playback signal path. Note that it is important to minimize the number of conversions between the digital and analog domains in order to get the best sound quality for digital sources. So in this sense, the cognitive loudspeaker system 200 is optimum because this system 200 can play any digital source with a single D/A conversion.

Power amplifiers 222-223 drive loudspeakers 224-225, respectively. Power amplifiers 222-223 are designed in connection with the loudspeakers 224-225 to optimize the SPS for performance and cost. Cognitive loudspeaker system 200 provides a wide design space, which allows loudspeaker and consumer electronics manufacturers to design systems that are highly optimized for performance and/or cost.

Figure 8:
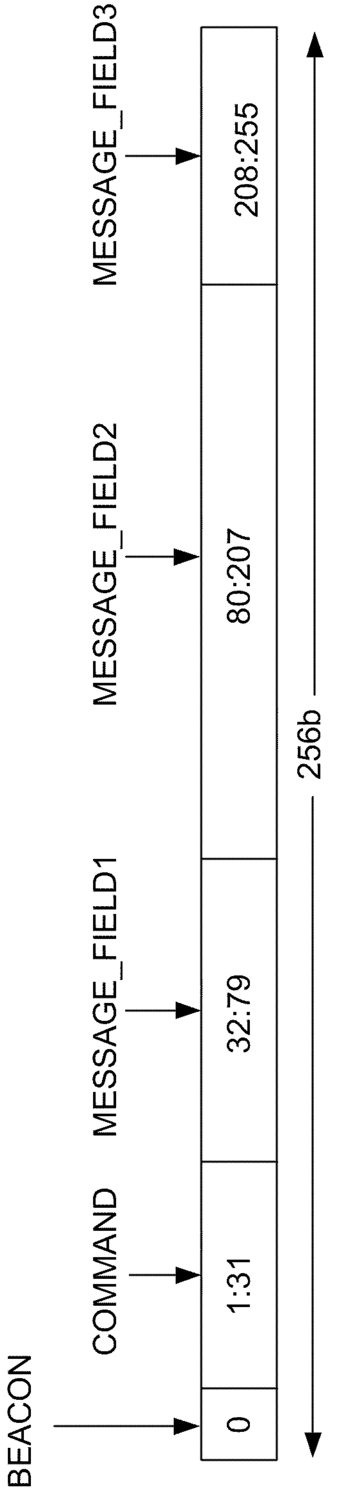
FIG. 8 is a block diagram of a message unit used to communicate between control stations sound production stations of the cognitive loudspeaker system of FIG. 2 in accordance with one embodiment of the present invention.

FIG. 8 is a block diagram of a message unit 800 used to communicate between the control stations 201-202 and SPSs 210-217 of cognitive loudspeaker system 200 in accordance with one embodiment of the present invention. Cognitive loudspeaker system 200 implements the following communication models: point to point transmission from a control station to a single SPS, point to point transmission from an SPS to a control station, and broadcast transmission from a control station to multiple SPSs. These communications are conducted through message unit 800. The initial message unit of a communication is initiated by the control station for all three communication models. Synchronization, error correction, protocol and higher application layers are built within the framework of the message unit 800.

Message unit 800 is a fixed format packet. In the described examples, message unit 800 has a width of 256 bits (i.e., m_unit[255:0]). The bits of message unit 800 are defined as follows.

Message unit bit m_unit[0] is a beacon that marks the beginning of the message unit 800. The beacon is modulated by a pseudo code sequence for phase synchronization, and identifies the beginning of the sample clock signal.

Message unit bits m_unit[1:31] identify a command, which defines the context of the message unit 800. The message unit bits m_unit[1:31]) is always generated by the control station.

Message unit bits m_unit[32:79] represent a first message field that carries synchronization information or data when the direction of dataflow is from the active control station 201 to the SPSs 210-217. This first message field is empty/silent when the direction of data flow is from an SPS to the active control station 201 (to avoid collisions).

Message unit bits m_unit[80:207] represent a second message field that carries synchronization information or data when the direction of dataflow is from the active control station 201 to the SPSs 210-217. This second message field carries synchronization information or data when the direction of dataflow is from an SPS to the active control station 201.

Message unit bits m_unit[208:255] represent a third message field that carries synchronization information or data when the direction of data flow is from the active control station 201 to the SPSs 210-217. This third message field is empty/silent when the direction of data flow is from an SPS to the active control station 201 (to avoid collisions).

FIGS. 9A, 9B, 9C and 9D form a table that provides a detailed description of the various messages that are implemented by message unit 800, in accordance with one embodiment of the present invention.

A configuration routine for cognitive loudspeaker system 200 will now be described. The configuration routine is a process used to change the non-volatile data stored in the SPSs 210-217 for one or more of the following reasons: a new system setup is required; it is necessary to add or remove an SPS from the playback system; it is necessary to change the placement of an SPS; or, it is necessary to update the firmware of an SPS. The configuration process involves point-to-point communication between the active control station 201 and a single SPS. A mechanism is provided to enable/disable configuration in the SPS, thereby preventing an SPS from being configured unexpectedly. This mechanism can include a mode setting switch on the SPS or an air interface protocol, as described in more detail below.

In general, there are two types of configuration, including vendor/manufacturer specific configuration and standard configuration. The vendor/manufacturer specific configuration is used, for example, to perform a firmware update. Standard configuration data includes: the SPS channel ID, the next SPS channel ID or last channel indicator, the playback system ID, the sensitivity of the channel (i.e., sound pressure as a function of the signal level), the relative coordinates of the SPS to the first channel, and the acoustic environment of the SPS.

Figure 10:
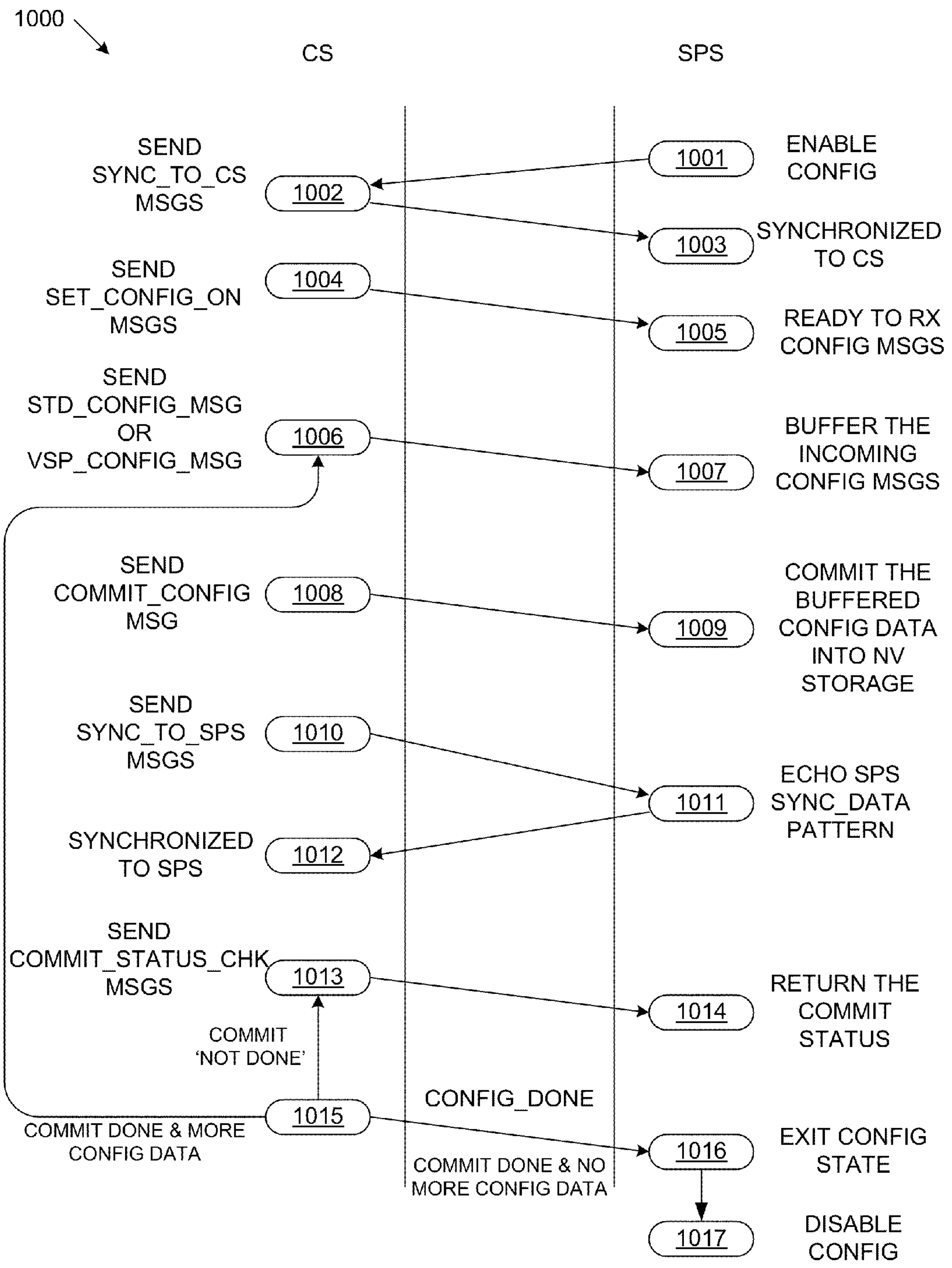
FIG. 10 is a flow diagram of a configuration routine implemented by the cognitive loudspeaker system of FIG. 2 in accordance with one embodiment of the present invention.

FIG. 10 is a flow diagram of a configuration routine 1000 implemented by cognitive loudspeaker system 200, in accordance with one embodiment of the present invention. In step 1001, the configuration process is enabled within the SPS (e.g., by toggling a switch on the SPS). Only one SPS is enabled in step 1001.

In step 1002, the active control station 201 transmits a 'sync_to_CS' message unit. As illustrated by FIG. 9A, the 'sync_to_CS' message unit includes synchronizing data ('sync_data') driven by the active control station 201 in the three message fields m_unit[32:255] of the message unit. This message is repeatedly broadcast by the active control station 201 for a fixed time period, thereby allowing enabled SPSs to synchronize to the active control station 201. Any enabled SPS that has not been incorporated into a playback system will attempt to synchronize with the active control station 201 upon receiving the 'sync_to_CS' message unit. Note that the active control station 201 may survey the radio environment to select a frequency hopping plan and a duty cycle in order to avoid interference with another nearby cognitive loudspeaker system at this time. (See, e.g., FIG. 5.) At step 1003, the enabled SPSs are synchronized with the active control station 201.

In step 1004, the active control station 201 transmits a 'set_config_on' message unit. As illustrated by FIG. 9B, the 'set_config_on' message unit includes 'sync_data' driven by the active control station 201 in the three message fields m_unit[32:255]. Upon receiving the 'set_config_on' message unit, an SPS is set to a configuration state (Step 1005). The present embodiment assumes that the configuration mechanism is enabled in only one of the SPSs. At this time, the SPS is ready to receive configuration messages from the control station.

As described above, the SPS can be selected manually. For example, the user can replace the left and right channel speakers with better speakers. In this case, the user just needs to configure the pair of the new speakers. In another example, if the user wants to increase from 5.1 system to a 7.1 system, the user needs to configure the new speakers as well as the neighboring channels.

At Step 1006, the active control station 201 transmits one or more 'std_config_msg' message units and/or one or more 'vsp_config_msg' message units. As illustrated by FIG. 9B, each 'std_config_msg' message unit includes a standard configuration message in the three message fields m_unit[32:255]. This standard configuration message includes important configuration data, including: the channel ID, playback system ID, a link list to enable the control station to address each SPS within the playback system, and the co-ordinate of the SPS within the playback system. As illustrated by FIG. 9B, each 'vsp_config_msg' message unit includes a vendor specific configuration message. This vendor specific configuration message may include, for example, a firmware update for the SPS. Note that the message format, content and the associated driver software are defined completely by the SPS vendor in the described embodiments.

At step 1007, the SPS buffers the incoming configuration message units. At step 1008, the active control station 201 transmits a 'commit_config' message unit to the enabled SPS. The 'commit_config' message unit includes sync_data driven by the control station in the three message fields m_unit[32:255]. In response to receiving the 'commit_config' message unit, the enabled SPS commits the buffered configuration data into its non-volatile storage (step 1009).

At step 1010, the active control station 201 transmits a plurality of 'sync_to_SPS' message units to the enabled SPS. The function of the 'sync_to_SPS' message units is to allow the active control station 201 to synchronize to the enabled SPS. This 'sync_to_SPS' message unit includes sync_data driven by the active control station 201 in the second message field (m_unit[32:79]), but is silent/empty in the first and third message fields (m_unit[1:31] and m_unit[208-255]). Only one of the SPSs is enabled to process the 'sync_to_SPS' message unit. This SPS drives a return 'sync_to_SPS' message unit to the active control station 201 in response to receiving the 'sync_to_SPS' message unit transmitted by the active control station 201 (step 1011). This 'sync_to_SPS' message unit includes sync_data driven by the active control station 201 in the second message field (m_unit[32:79]), but is silent/empty in the first and third message fields (m_unit [1:31] and m_unit[208-255]). The active control station 201 detects this return 'sync_to_SPS' message unit and attempts to synchronize to this signal (step 1012). Note that the active control station 201 will continue sending 'sync_to_SPS' messages, and the SPS will continue returning 'sync_to_SPS' messages, until the active control station 201 is synchronized to the SPS.

At step 1013, the active control station 201 transmits 'commit_status_chk' message units to the enabled SPS. The 'commit_status_chk' message unit is used by the active control station 201 to poll the commit status of the enabled SPS (i.e., whether or not the previously buffered configuration messages have been committed into non-volatile storage of the enabled SPS). Upon receiving a 'commit_status_chk' message unit, the SPS returns a 'commit_status_chk' message unit to the control station (step 1014), wherein this return message unit includes the commit status ('done' or 'not done' in the second message field (m_unit[[80:207]).

The active control station 201 receives the commit status transmitted by the enabled SPS (step 1015). If the commit status received by the active control station 201 is 'not done', then processing returns to step 1013. If the commit status received by the active control station 201 is 'done', but there is more configuration data to be processed, then processing returns to step 1006 and the additional configuration information is provided to the enabled SPS. If the commit status received by the active control station 201 is 'done', and there is no more configuration data to be processed, then the active control station 201 transmits a 'config_done' message unit to the enabled SPS. In response to the 'config_done' message unit, the SPS exits the configuration routine (step 1016), and disables the configuration mode for this SPS (step 1017), thereby completing the configuration process for this SPS. In a particular embodiment, the SPS may enable an indicator light or tone upon receiving the 'config_done' message unit, thereby instructing the user to toggle the mode setting switch on the SPS, thereby disabling the configuration mode for the SPS. The configuration process is performed as needed; for example, to setup a new system or update an existing system.

After the configuration routine has been completed, the setup routine can be run. The setup routine will now be described. The active control station 201 executes the setup routine when the system 200 is powered up, and each time that the active control station is switched and the new active control station needs to update the playback executable 702.

In general, the setup routine is used to identify the following information for each SPS: the channel ID, the next channel ID, the playback system ID, the sensitivity of the channel, the co-ordinate of the SPS within the playback system, the acoustic environment of the SPS, the capabilities of the SPS (e.g., the resolution, the execution pipeline speed, and the software capability profile), and the timing requirement of the local signal processing of the SPS. Based on this information and the computing requirement in decoding the source in each available playback channel, the active control station 201 will generate the following data for each channel (SPS): the playback executable 702; the buffering requirement so that all playback channels can be synchronized, the equalization (level and timing) to compensate for misplacement of the SPS; and the delay requirement for sample-to-playback in order to for the playback system to be synchronized. The active control station 201 will then establish a point-to-point connection to download the above data to each SPS. After downloading this data to each SPS, the active control station 201 will set the playback system in a ready state, so that the SPSs can decode the playback stream subsequently broadcast from the active control station 201.

Note that if the setup routine is executed due to a change in the active control station, the new active control station may need to recompile the playback executable 702 of each SPS. If there is a handover of the active control station to another control station (e.g., control station 202 becomes the new active control station), then the execution state information is transferred from the previous active control station to the new active control station. This execution state information includes the current program state of the cognitive loudspeaker system 200. The new active control station will determine if the setup routine must be run based on this execution state information and the new decoding requirements.

Figure 11:
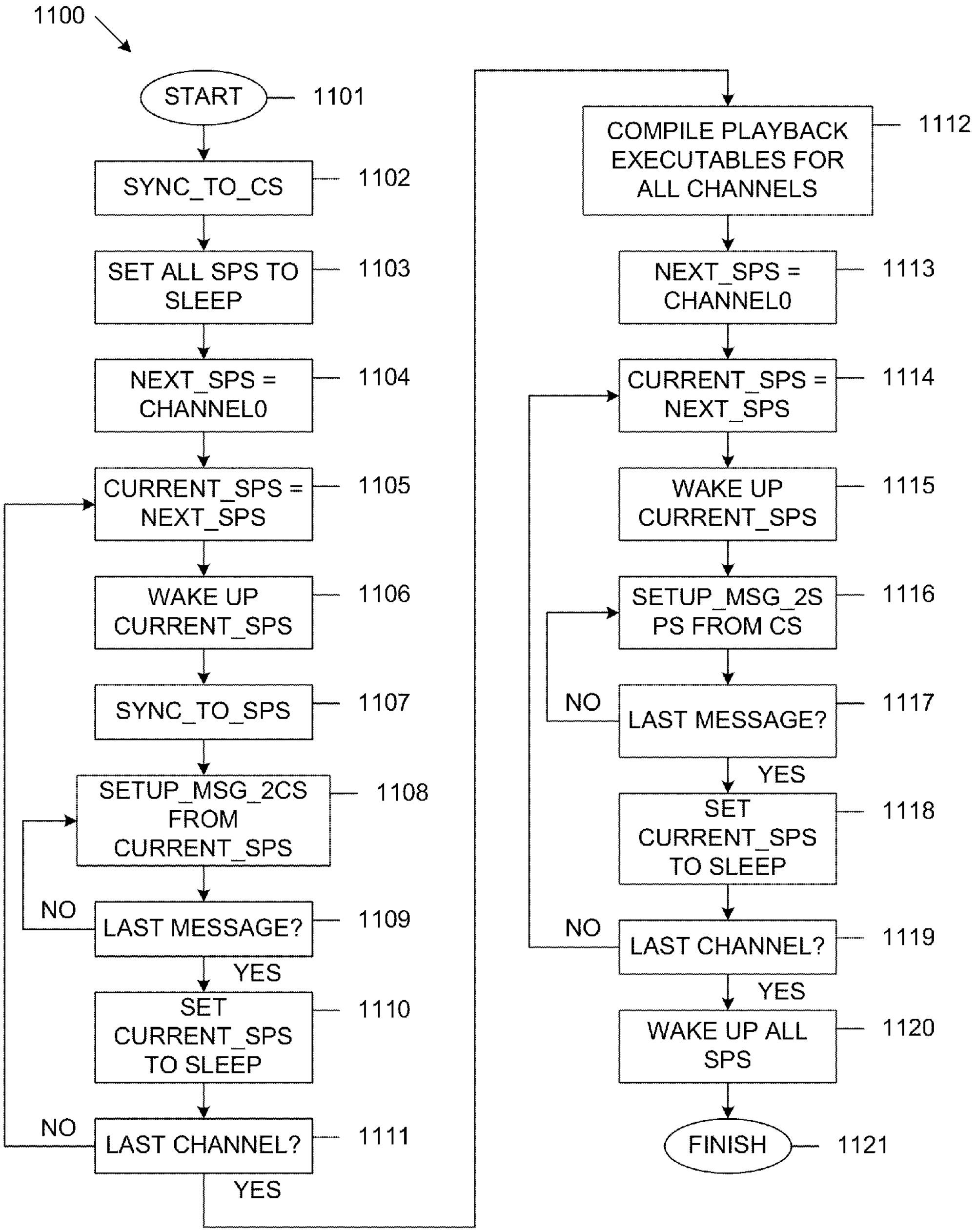
FIG. 11 is a flow diagram of a setup routine implemented by the cognitive loudspeaker system of FIG. 2 in accordance with one embodiment of the present invention.

FIG. 11 is a flow diagram 1100 illustrating the setup routine implemented by the control station and the SPS in accordance with one embodiment of the present invention. After the setup routine is started (step 1101), the CS transmits the 'sync_to_CS' message unit (step 1102), such that all of the SPSs are synchronized to the active control station. The active control station then transmits a 'set_SPS_sleep' message unit to the SPSs (step 1103). As illustrated by FIG. 9B, the 'set_SPS_sleep' message unit includes sync_data, driven by the active control station, in the first and third message fields (m_unit[32:79] and m_unit[208:255]), and an SPS channel identifier in the second message field (m_unit[80:207]). The SPS channel identifier of the 'set_SPS_sleep' message unit sent during step 1103 specifies all of the SPSs 210-217. In response to detecting this 'set_SPS_sleep' message unit, all of the SPSs 210-217 are set to sleep. Once in the sleep state, an SPS will remain inactive until receiving a wake up message unit from the active control station 201.

In step 1104, a variable 'next_SPS' is set equal to channel_0, wherein channel_0 identifies a predefined SPS (i.e., default channel) of system 200 (e.g., the SPS 210 that operates as the left front speaker channel). In step 1105, a variable 'current_SPS' is set equal to the 'next_SPS' value (i.e., channel_0). In step 1106, the active control station 201 transmits a 'set_SPS_awake' message unit. As illustrated by FIG. 9C, the 'set_SPS_awake' message unit includes sync_data, driven by the active control station in the first and third message fields (m_unit[32:79] and m_unit[208:255]), and an SPS channel identifier in the second message field (m_unit[80:207]). The SPS_channel identifier of the 'set_SPS_awake' message unit sent during step 1106 specifies the SPS identified by the 'current_SPS' value (e.g., SPS 210). In response to detecting the 'set_SPS_awake' message unit, the identified SPS 210 is awaken to continue the setup process for this SPS.

Upon waking up, the SPS 210 transmits a 'sync_to_SPS' message unit, allowing the active control station 201 to synchronize with the identified SPS 211 (step 1107). The identified SPS 210 then transmits 'setup_msg_2CS' message units to the CS (step 1108). As illustrated by FIG. 9C, the 'setup_msg_2CS' message units are silent in the first and third message fields, and include setup data in the second message field. The setup data includes profile information associated with the SPS, including for example, performance, sampling rate, resolution, time required for local signal processing and API version. The setup data also includes the playback system ID, the channel ID of the SPS, the channel ID of the next_SPS, and an indication of whether the SPS is the last SPS of the system. Processing loops back from step 1109 to step 1108 until all of the setup data has been transmitted from the identified SPS 210 to the active control station 201. After all of the setup data of the identified SPS 210 has been transmitted to the active control station 201 (step 1109, Yes branch), the active control station 201 transmits a 'set_SPS_sleep' message unit to the identified SPS 210 (step 1110). This 'set_SPS_sleep' includes an SPS channel identifier that identifies the channel associated with the 'current_SPS' value (e.g., SPS 210). In response to detecting the 'set_SPS_sleep' message, this SPS 210 is set to sleep.

From the setup data retrieved during step 1108, the active control station 201 determines whether the SPS identified by the variable 'current_SPS' represent the last channel of the system 200 (step 1111). If not, processing returns to step 1105, wherein the variable 'current_SPS' is set equal to the variable 'next_SPS' retrieved during step 1108. Steps 1106-1110 are then repeated, such that the setup data of the next_SPS is provided to the active control station 201 in the manner described above.

When the setup data for all of the SPSs 210-217 has been transmitted to the active control station 201, this control station 201 compiles the playback executables 702 for all of the channels/SPSs (Step 1112). In this step, the active control station 201 determines the delays to be introduced by the various SPSs, such that the playback of the playback stream is synchronized within all of the SPSs 210-217. In step 1113, the variable 'next_SPS' is again set equal to channel_0, wherein channel_0 identifies SPS 210. In step 1114, the variable 'current_SPS' is set equal to the 'next_SPS' value. In step 1115, the active control station 201 transmits a 'set_SPS_awake' message unit to wake up the SPS identified by the 'current_SPS' value (e.g., SPS 210). In response to detecting the 'set_SPS_awake message, the identified SPS 210 wakes up to continue the setup process for this SPS.

After waking up the current_SPS 210, the active control station 201 transmits 'setup_msg_2SPS' message units to the current_SPS (step 1116). As illustrated by FIG. 9C, the 'setup_msg_2CS' message units include setup data in the first, second and third message fields (m_unit[32:255]). The setup data includes: the sampling clock rate, the resolution of the samples, the timing (delay in sample clock cycles) of the samples, and the executable objects for decoding the playback stream.

Processing loops back from step 1117 to step 1116 until all of the setup data has been transmitted from the active control station 201 to the current_SPS 210. After all of the setup data has been transmitted from the active control station 201 to the current_SPS 210 (step 1117, Yes branch), the active control station transmits a 'set_SPS_sleep' message unit to the current_SPS 210 (step 1118). This 'set_SPS_sleep' includes an SPS channel identifier that identifies the channel associated with the 'current_SPS' value (e.g., SPS 210). In response to detecting the 'set_SPS_sleep' message, this current_SPS 210 is set to sleep.

The active control station 201 determines whether the SPS identified by the variable 'current_SPS' represents the last channel of the system 200. If not, processing returns to step 1114, wherein the variable 'current_SPS' is updated to identify the next_SPS of the system. Steps 1115-1118 are then repeated, such that the active control station 201 provides setup data to the next_SPS, in the manner described above.

When the active control station 201 has transmitted the setup data for all of the SPSs 210-217, the CS transmits a 'set_SPS_awake' message unit (step 1120). The SPS identification field of the 'set_SPS_awake' message unit sent during step 1120 identifies all of the SPSs 210-217. In response to detecting this 'set_SPS_awake' message, the SPSs 210-217 all wake up, thereby setting the system 200 into playback mode. At this time the setup routine is complete (step 1121).

The control station handover process (which is implemented by CS handover logic 205) will now be described. There is only one active control station at any given time. In the examples described above, control station 201 is assumed to be the active control station. Other control stations (e.g., control station 202) can request that the role of active control station be transferred. This is accomplished through the control station handover process. The necessary communications for the handover between different control stations are conducted via alternative channels (e.g., WiFi or Bluetooth).

Figure 12:
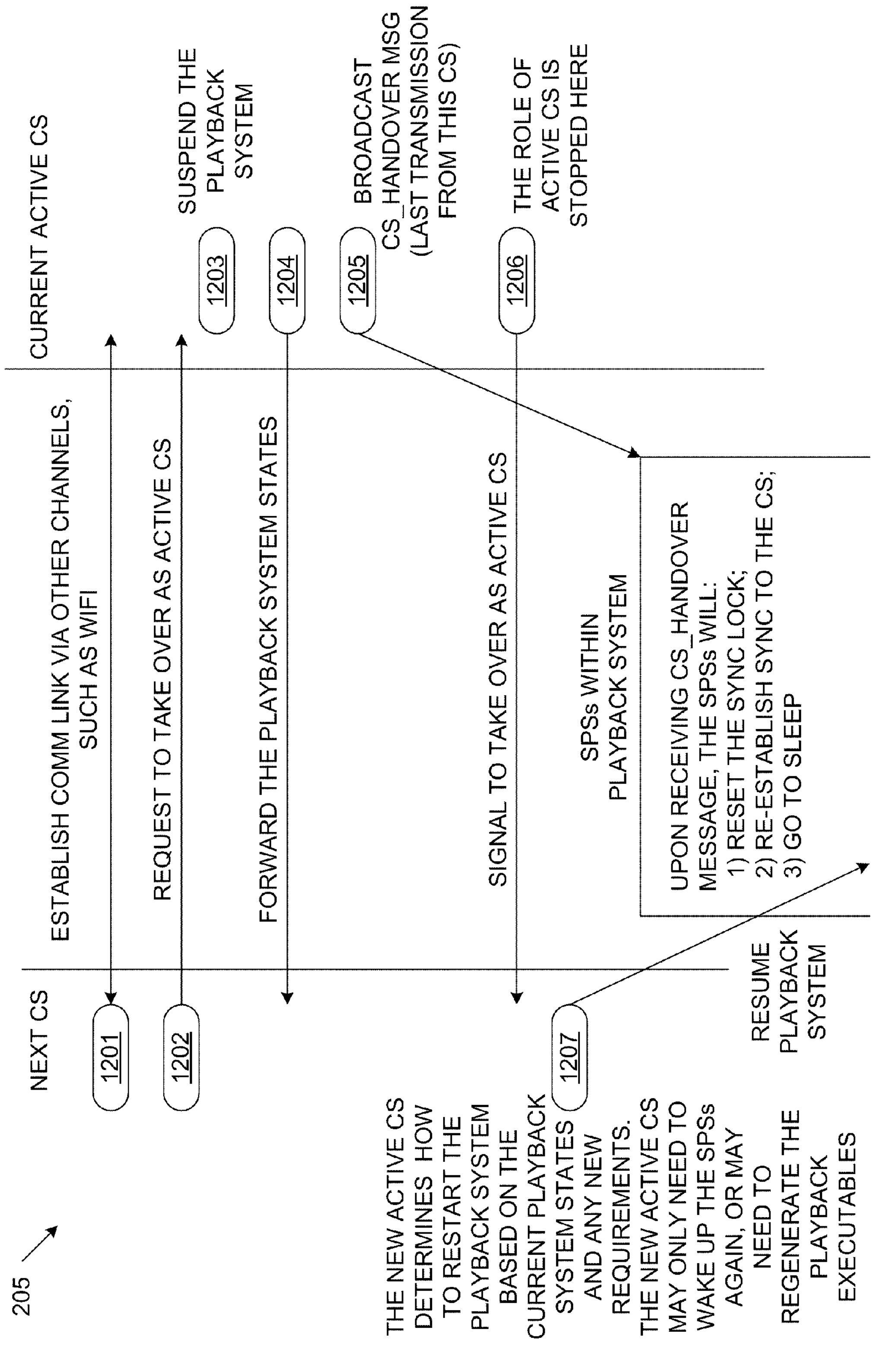
FIG. 12 is a flow diagram of a control station handover process implemented by the cognitive loudspeaker system of FIG. 2 in accordance with one embodiment of the present invention.

FIG. 12 is a flow diagram of the control station handover process 205 in accordance with one embodiment of the present invention. In step 1201, a communication link is established between the current active control station 201 and the next active control station 202 (e.g., via WiFi or Bluetooth). The next active control station 202 then transmits a request to take over as the active control station (step 1202). In response, the current active control station 201 suspends operation of the playback system (step 1203), forwards the playback system state information to the next active control station 202 (step 1204), and broadcasts a 'cs_handover' message unit to the SPSs 210-217 (step 1205). As illustrated by FIG. 9D, the 'cs_handover' message unit includes sync_data in all three message fields (m_unit[31:255]). A special sync_data pattern is used to ensure the probability of decoding the message unit incorrectly is minimized. The 'cs_handover' message unit is the last message sent by the current active control station 201 before it relinquishes its responsibilities. In response to detecting the 'cs_handover' message unit, the SPSs 210-217 will: reset the synchronization clock, re-establish the synchronization to the control station 201 and then go to sleep.

The current active control station 201 will then send a signal to the next active control station 202, instructing the next active control station to take over as the active control station (step 1206). The next active control station 202 will decide how to restart the playback system 200 based on the current playback system states and the new requirements (if any) of the new active control station (Step 1207). It may be possible for the new active control station 202 to simply wake up the SPSs 210-217. Alternately, it may be necessary for the new active control station 202 to regenerate the playback executables 702 as described above in connection with FIG. 10.

Figure 13:
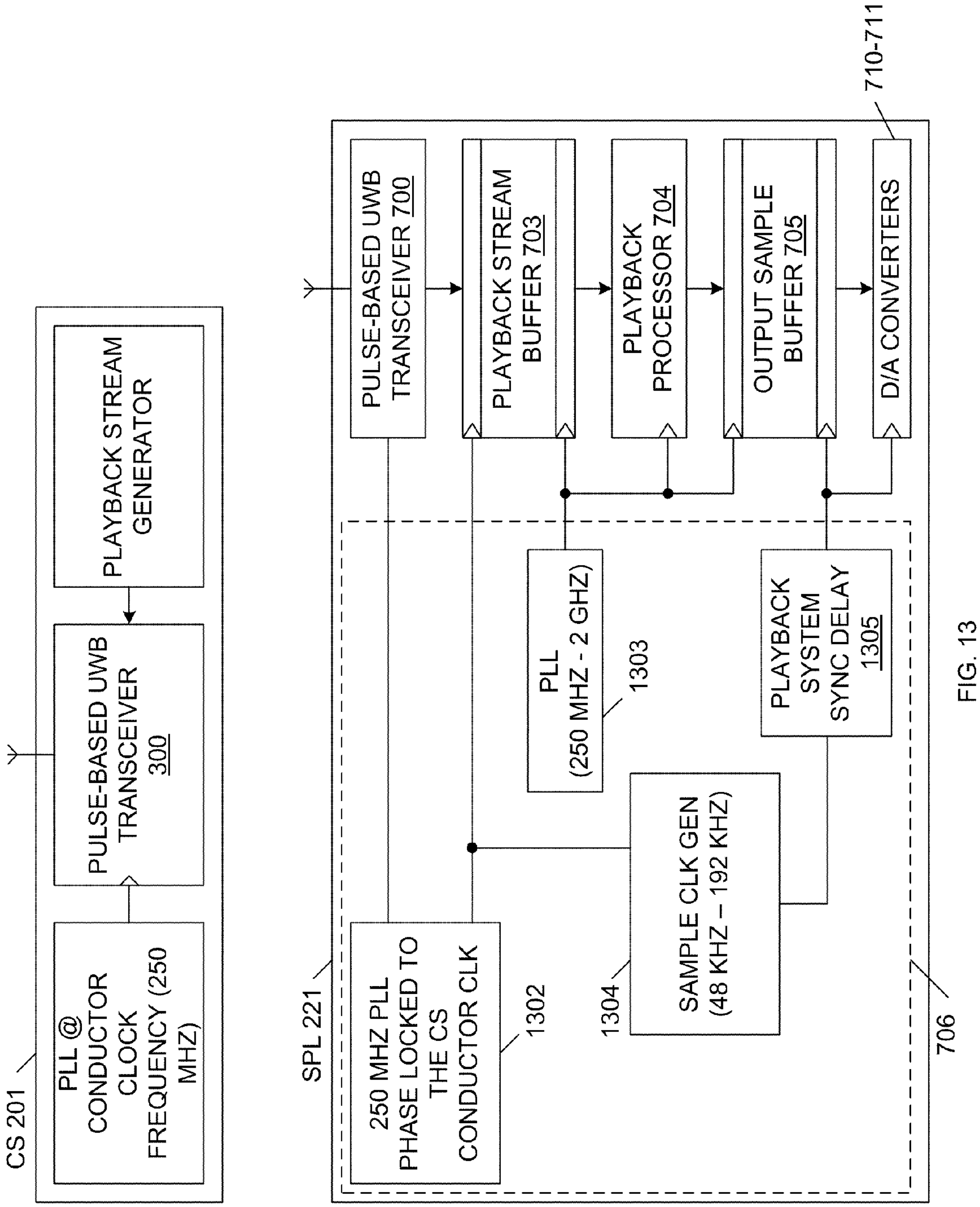
FIG. 13 is a block diagram of sound production logic, which is present in the sound production station of FIG. 7 in accordance with one embodiment of the present invention.

Playback timing control will now be described. FIG. 13 is a block diagram of SPL 221, which illustrates playback timing control logic 706 in more detail. Playback timing control logic 706 includes clock control circuit 1302, phase locked loop and 1303, sample clock generator 1304 and delay logic 1305.

The active control station 201 transmits a 'start_sample_clk' message unit to the SPSs 210-217. As illustrated in FIG. 9D, the 'start_sample_clk' message unit includes a sample clock frequency value in the first message field (m_unit[32:79), and 'sync_data' in the second and third message fields (m_unit[80:255]). The sample clock frequency value specifies the frequency of a sample clock to be generated within the SPSs 210-217.

Within each SPS, the clock control circuit 1302 detects the received 'start_sample_clk' message unit. In response, clock control circuit 1302 causes sample clock generator 1304 to generate a sample clock signal having the frequency specified by the sample clock frequency value of the 'start_sample_clk' signal. Sample clock generator 1304 generates the sample clock digitally, by counting the conductor clock signal of transceiver 700. That is, the sample clock generator 1304 toggles the sample clock every M counted cycles of the conductor clock signal. As described above, the conductor clock signal of the transceiver 700 is synchronized with the conductor clock signal of transceiver 600 in the active control station 201. In the illustrated embodiment, the clock control circuit 1302 provides the conductor clock signal of transceiver 700 to sample clock generator 1304.

In response to receiving the 'start_sample_clk' message unit, clock control circuit 1302 also detects the beacons of subsequent message units received by transceiver 700, and synchronizes the sample clock signal to these beacons. In this manner, the transceivers 700 of the SPSs 210-217 are phase locked to the transceiver 600 of the active control station 201, and are also code locked to the beacon of the message units broadcast from the active control station 201. Because the sample clocks within the SPSs 210-217 start at the same time, and the phase locking mechanism between the active control station 201 and the SPSs 210-217 prevent clock drifting of the conductor clock, then clock drifting of the sampling clock is also necessarily prevented.

Playback system synchronizing delay logic 1305 introduces a delay to the sample clock signal, thereby creating a delayed sample clock signal. The delay introduced is equal to a number of cycles of the sample clock signal. The specific number of delay cycles is independently selected within each of the SPSs 210-217, such that the output sampling (described below) is synchronized across all of the SPSs 210-217. The delay introduced by each of the SPSs is established by the active control station 201 during the setup routine. More specifically, the playback executable 702 previously downloaded from the active control station 201 includes information that defines the delay introduced by delay logic 1305. In this manner, the output sampling within each of the SPSs is synchronous to within a fraction of a cycle of the sample clock.

To implement playback, the active control station 201 transmits 'playback_msg' message units to the SPSs 210-217. All of the SPSs 210-217 receive the same 'playback_msg' message units. The beginning of the 'playback_msg' includes the beacon, which is made up of a pre-determined pseudo-random code. As illustrated by FIG. 9C, the three message fields of the 'playback_msg' message unit include the content of the playback material. The layer and format of the playback material is defined by the software layer above the playback executable 702 and playback messages. As described above, the transceiver 600 in the active control station 201 and the transceivers 700 in the SPSs 210-217 all operate at the frequency of the conductor clock signal (e.g., 250 MHz in the described embodiments).

The conductor clock is used to clock the 'playback_msg' message units into playback stream buffer 703.

An independent PLL 1303 is used to generate the playback processor clock in the SPS. This clock can be scaled to satisfy the computing power to finish the required decoding and signal processing in a timely manner. In the described examples, the playback processor clock has a frequency in the range of about 500 MHz-2 GHz. The playback processor clock is used to clock playback data from the playback stream buffer 703 to the playback processor 704. The playback processor 704 operates in response to the playback processor clock. More specifically, the playback processor 704 processes the playback data included in the message fields of the 'playback_msg' message unit to extract the digital playback data for the channel associated with the SPS. Note that the playback processor 704 operates in accordance with information provided by the previously configured playback executable 702. The playback executable 702 is the program used to process the playback stream. The playback executable 702 and the playback stream are completely flexible and programmable. So any programmable device with sufficient processing power and functions can be used to implement playback processor 704. Playback processor 704 can be an ARM processor, PPC or a custom instruction set processor. Note that it is not necessary to tie the CLS to any particular instruction set architecture. So that is why the present embodiment includes the software layer and API. This software infra-structure is highly programmable and processor architecture independent.

Playback processor 704 transmits the extracted digital playback data to output sample buffer 705. The digital playback data is latched into output sample buffer 705 in response to the playback processor clock. Note that the playback processor clock is faster than the sample clock. The playback processor 704 has sufficient throughput to produce a sample per cycle of the sample clock. Due to the data dependence of the processing step and the ease of software partition between the playback executable and the local processing routines, a user may implement a pipeline of signal processors to perform significant local processing within the SPS, if desired. In this case, the SPS produces a sample per cycle of the sample clock, but may take more than one sample clock cycle to create an initial sample. In an alternate embodiment, playback processor 704 can be implemented with a device, such as an FPGA device, which operates at a relatively low speed, but includes more computing resources. The CLS 200 allows any SPS to take longer than one sample clock to create the sample as long as it can sustain a sample per sample clock cycle throughput. The output sample buffer 705 is designed to provide enough entries to delay the faster SPS so that all the channels are synchronized.

The playback data is transferred out of the output sample buffer 705, and through the D/A converters 710-711 in response to the delayed sample clock signal.

Figure 14:
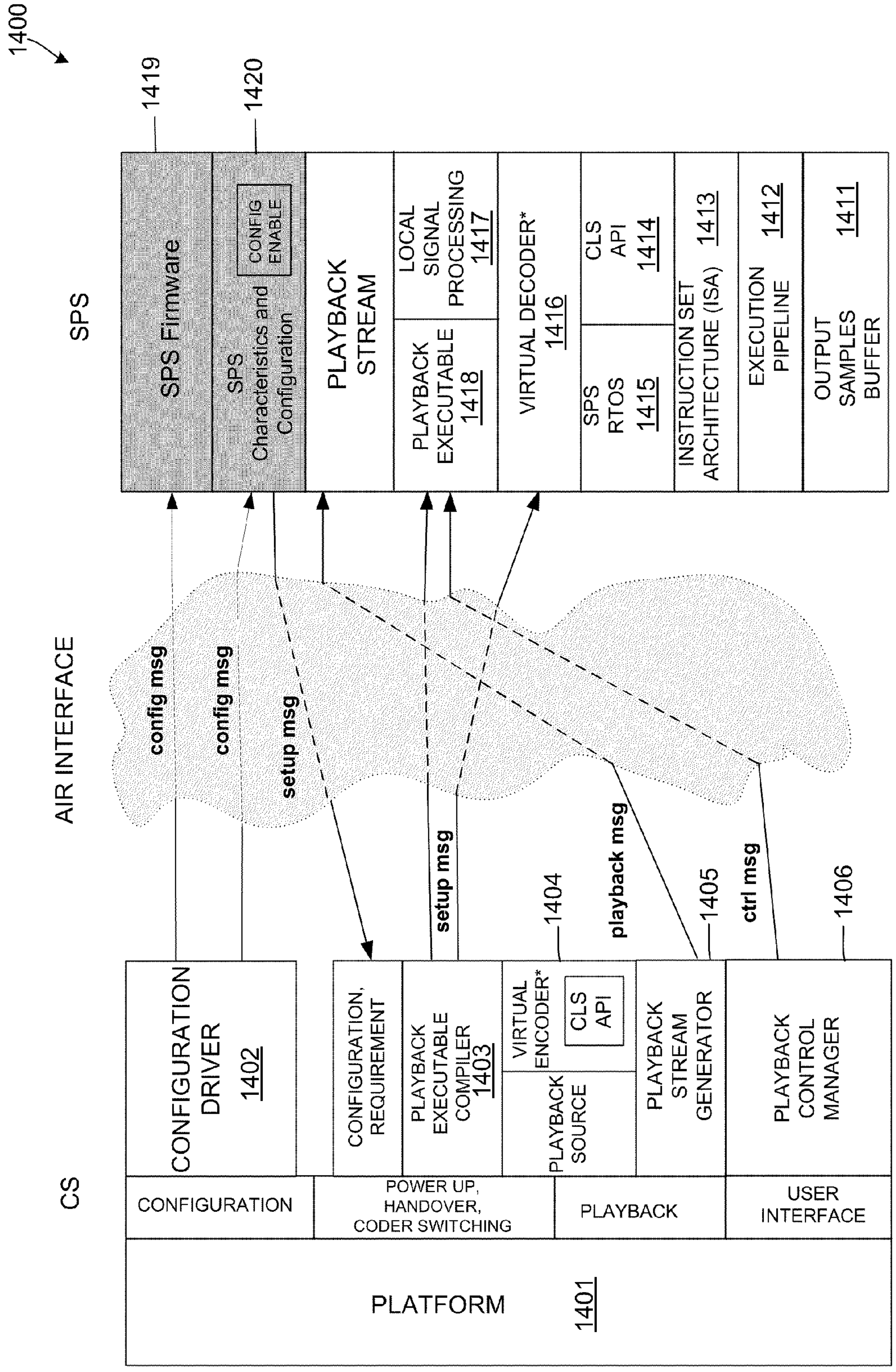
FIG. 14 is a block diagram illustrating the software architecture of the cognitive loudspeaker system of FIG. 2 in accordance with one embodiment of the present invention.

FIG. 14 is a block diagram illustrating the software architecture 1400 of cognitive loudspeaker system 200 in accordance with one embodiment of the present invention.

Software architecture 1400 in the active control station 201 includes system platform 1401, configuration driver 1402, playback executable compiler 1403, virtual coder 1404, playback stream generator 1405, and playback control manager 1406. System platform 1401 is provided by the vendor of the active control station 201. The control station software runs on top of this platform 1401.

Configuration driver 1402 includes software to control the configuration of the SPS. This is an optional feature of the active control station 201. In one embodiment, configuration driver 1402 implements a standard configuration, so that any control station can configure any SPS. In an alternate embodiment, configuration driver 1402 can implement vendor/manufacturer specific configuration. In this embodiment, the software interface is standardized so that the software provided by any SPS manufacturer can be integrated into the control station configuration manager.

Playback executable compiler 1403 controls the setup and handover routines of the playback system in the manner described above. Playback executable compiler 1403 compiles the playback executables of the SPSs 210-217 based on the following inputs: configurations and requirements from all of the SPSs gathered during the setup or handover routines, the virtual coder layer of the playback system, and the playback source format.

Playback stream generator 1405 controls the delivery of the playback stream to the SPSs 210-217. Playback stream generator 1405 generates the playback streams based on the virtual coder layer of the playback system and the playback source.

Playback control manager 1406 provides a user interface to control the playback system. Playback control manager 1406 generates control messages to the SPSs 210-217 in order to realize the user controls. Hooks are provided in the playback executables handle these requests. For example, playback control manager 1406 transmits 'ctrl_msg' message units (see, FIG. 9D), which include sync_data in the first and third message fields, and a control message in the second message field. The control message identifies the playback system (playback system ID) and the SPS (SPS ID). This control message controls, for example, volume, timing delay and other operations of the playback system. A standard control message may include, for example: a start of content indicator, an end of content identifier, volume control, timing delay control, sleep control, and shutdown control.

Software architecture 1400 in each of SPSs 210-217 includes output sample buffer software 1411, execution pipeline 1412, instruction set architecture 1413, API 1414, SPS real time operating system (RTOS) 1415, virtual decoder 1416, local signal processing software 1417, playback executable software 1418, SPS firmware 1419, and SPS characteristics and configurations software 1420.

Output sample buffer software 1411 provides an interface between the cognitive loudspeaker system 200 and the loudspeakers.

Execution pipeline 1412 includes the pipeline, memories and co-processors for computation.

Instruction Set Architecture (ISA) 1413 is an instruction set of the execution pipeline 1412. In accordance with one aspect of the present invention, the architecture of cognitive loudspeaker system 200 is not tied to any particular ISA.

Cognitive loudspeaker API 1414 is a standardized software interface that allows the cognitive loudspeaker system 200 to be implemented by various ISA such as PowerPC, ARM, Intel or custom ISA.

SPS RTOS 1415 is an operating system to control the configuration, setup, playback and user control of the SPS.

Local signal processing software 1417 is specific to the SPS, and performs correction and compensation, equalization and cross-over functions. The local signal processing software 1417 within each SPS informs the SPS characteristics and configuration software 1420 of the execution time of its local processing so that the active control station 201 can synchronize the sampling timing of all the channels.

Playback executable software 1418 includes the playback executables downloaded from the active control station 201 during the setup or handover routine. Each SPS has its own version of the playback executable to process a single playback stream broadcast by the active control station 201.

SPS firmware 1419 includes non-volatile storage to store OS code, configurations and characteristics.

SPS characteristics and configurations software 1420 includes information to be forwarded to the active control station 201 during the setup routine in order for the CS to setup the playback system. The following information is necessary: the channel ID, the next channel ID, the playback system ID, the co-ordinate of the SPS within the playback system, the capabilities of the SPS (e.g., the resolution, the execution pipeline speed, the API profile), and the timing requirement of the local signal processing.

Coder virtualization is implemented by the virtual encoder 1404 in the active control station 201 and the virtual decoder 1416 in the SPSs. Coder virtualization allows the playback to be conducted in a format defined by virtual encoder 1404/virtual decoder 1414, regardless the format of the playback sources. This software layer is built upon the cognitive loudspeaker API 1414. The virtual encoder 1404 compiles the virtual decoders for the SPSs and translates the various playback formats into the virtual code format. These roles can be performed in real time or during pre-processing. The virtual decoder 1416 is downloaded to the SPSs from the active control station 201 as part of the setup routine. The virtual decoder 1416 decodes the playback stream transmitted by the active control station 201.

The rationale for coder virtualization is described below. First, coder virtualization reduces signal processing complexity. LPCM is a time domain code, while MP3, AAC and AC3 are frequency domain codes. Local signal processing and room acoustic processing is mostly performed in the frequency domain. Hardcoding the playback executable to a particular format will therefore require unnecessary setup and transformation if different formats are to be enabled for playback.

In addition, coder virtualization provides format independence within system 200. In order to enable playback of a digital stream having a new format, all that is needed is a new translator in the virtual encoder 1404.

Moreover, coder virtualization provides more efficient setup and handover routines. Furthermore, coder virtualization makes it easy to standardize the software layer between the active control station 201 and the SPSs so that this software layer can facilitate the deployment of the cognitive loudspeaker system 200. In addition, coder virtualization makes it easy to integrate the source decoding processing and local signal processing.

Coder virtualization also allows the coder to be optimized for the content of the sources. For example, different virtual coders can be implemented for high fidelity stereo classical/jazz playback and for 7.1 surround sound playback.

Finally, coder virtualization provides cost savings, because the cost of a software coder is much less than the cost of a hardware coder. Note that only one software coder is needed in the active control station 201.

Cognitive loudspeaker system 200 improves upon conventional digital audio systems as follows. Cognitive loudspeaker system 200 provides for improved system partitioning. That is, system 200 allows all loudspeaker specific operations to be pushed back into the loudspeaker itself. The playback function is mainly controlled by software from any compatible CS device. The communication and synchronization between these system components are conducted through a simple wireless interface. As a result, the CS-SPS model allows any compatible mass market device, such as a laptop, mobile phone or television, to drive the playback system directly. Moreover, the software defined decoder enables coding virtualization, which allows audio having any digital format to be played by system 200. There is no need to change the system hardware to implement a new coding format.

Moreover, each loudspeaker is a self sufficient signal processor and playback unit. As a result, the manufacturer has more tools to optimize product price and performance. Furthermore, because each loudspeaker (SPS) is a self sufficient signal processor and playback unit, loudspeakers can be easily added and deleted from the playback system 200.

From the user's point of view, cognitive loudspeaker system 200 provides the freedom to play any content from any device at home. For example, high end classic music can be played from a laptop computer, and a 10.2 surround sound movie can be played from a set top box or a television. System 200 also provides high performance at a low cost. Each loudspeaker is highly optimized for the entire signal path, thereby improving the sound quality and lowering the price significantly. There is no need to include an expensive and complicated AV processor and the associated amplification circuitry. Note that a conventional AV processor becomes obsolete when new coding standards emerge. This is not the case in system 200, wherein coder virtualization eliminates this obsolescence issue.

Cognitive loudspeaker system 200 also provides the advantage of a single D/A conversion in the entire signal path of the playback system, so there less sound quality degradation. In addition, system 200 allows high end and low end loudspeakers to be intermixed within the same system 200, without worrying how these speakers are driven. System 200 allows for highly optimized signal processing to optimize the sound and experience.

Because cognitive loudspeaker system 200 does not require speaker cables to connect the loudspeakers (SPSs) to the active control station, the room containing system 200 will look cleaner. This is especially true as the number of loudspeakers increase in future home theater systems (e.g., stereo, 5.1, 7.1, 10.2, 22.2). Moreover, system 200 allows more features to be introduced, and the user interface to be improved, simply by modifying software within the system.

Cognitive loudspeaker system 200 is a viable technology for the following reasons. First, transistors are getting cheaper and faster. In addition, the computing power required to process more channels within system 200 is scaled with the number of channels. Moreover, there is a moderate bit rate for audio coding within system 200 (e.g., less than 10 Mb for 24 bit×192 kHz stereo LPCM coding) and bit rates will not increase significantly by matrixing the channels as the number of channels increase. Furthermore, system 200 has modest computing requirements (e.g., 5000 instruction cycles per sample, when implementing a 2 GHz processing clock and a 192 kHz sampling clock, assuming half of the playback processor cycles can be used). In addition, the power consumption of system 200 is a second order issue.

Moreover, system 200 implements a benign air interface environment, and can be easily supported by the existing wireless technologies. The single source broadcasting and point-to-point communication is so simple that a complicated MAC layer is not necessary in system 200. Playback within system 200 consists of transient data, so security should not be a concern. Loudspeakers are most likely fixtures within the listening room, so mobility is not an issue. It is quite unlikely the SPSs are placed in different room or even in a room with very odd shape, so multipath interference should be very mild. The playback system 200 mostly likely will positioned indoors, with the playback system components likely located within 5 meters among each other.

Cognitive loudspeaker system 200 enables the manufacturer to make lower cost and higher performance media devices. System 200 is audio standard and coding neutral. System 200 is 100% wire free for interconnect, and can coexist with other wireless systems. System 200 can seamlessly connect to any compatible player, is easy to upgrade (sources, number of loudspeakers, changing loudspeakers) and provides optimum performance for both hi-fidelity music and multi-channel surround sound playback. System 200 enables integration of source decoding, room acoustic equalization and loudspeaker characteristic compensation in a single computation framework. System 200 also allows the audio source distributor to optimize coding for sound quality. System 200 also allows for the incorporation of video or other media into the playback system.

System 200 is much more cost effective than a conventional system for the following reasons. The audio coding separates the audio signal into frequency bands, so there is no need to have a cross-over network. Any deficiencies of the driver units, the impedance matching between the loudspeaker and the power amplifier, or the characteristic of the enclosure can be corrected by DSP algorithms. The room characteristics and the channel placement can be compensated by local signal processing at each SPS. This type of optimization requires: a signal processor for each channel; each signal processor at the loudspeaker is synchronized to within a sample clock; unique parameters for each loudspeaker model or even each copy of speaker; and unique parameters for each channel for the room and placement characteristics.

Although the invention has been described in connection with several embodiments, it is understood that this invention is not limited to the embodiments disclosed, but is capable of various modifications, which would be apparent to a person skilled in the art. Accordingly, the present invention is limited only by the following claims.

I claim:

1. A method comprising:

transmitting configuration information from a first sound production station to a first control station, wherein the configuration information defines operating characteristics of the first sound production station;

compiling a first playback executable in the first control station based on the configuration information and a playback source format of the first control station;

wirelessly transmitting a the first playback executable from a the first control station to a the first sound production station;

storing the first playback executable in the first sound production station;

wirelessly transmitting digital audio information from the first control station to the first sound production station; and decoding the digital audio information with a playback processor within the first sound production station, wherein the first playback executable controls the playback processor to decode the digital audio information in accordance with the playback source format.

2. The method of claim 1, further comprising generating digital audio samples with the playback processor in response to the digital audio information.

3. The method of claim 2, further comprising converting the digital audio samples into an analog output signal within the first sound production station.

4. The method of claim 3, further comprising:

amplifying the analog output signal; and driving a speaker with the amplified analog output signal.

5. The method of claim 1, wherein the step of decoding the digital audio information with the playback processor comprises extracting digital audio samples associated with a defined frequency range from the digital audio information.

6. The method of claim 1, further comprising:

transmitting the digital audio information from the first control station in response to a first conductor clock signal generated within the first control station;

receiving the digital audio information with the first sound production station in response to a second conductor clock signal generated within the first sound production station; and synchronizing the first conductor clock signal and the second conductor clock signal.

7. The method of claim 1, wherein the configuration information identifies a playback channel of the first sound production station.

8. The method of claim 1, wherein the configuration information includes a processing delay associated with the first sound production station.

9. The method of claim 1, further comprising transmitting the digital audio information using a complementary frequency hopping pulse modulation (CFHPM) scheme.

10. The method of claim 1, further comprising:

wirelessly transmitting a second playback executable from the first control station to a second sound production station, wherein the first playback executable is generated based on the playback source format of the first control station;

storing the second playback executable in the second sound production station;

wirelessly transmitting the digital audio information from the first control station to the second sound production station; and decoding the digital audio information with a second playback processor within the second sound production station, wherein the second playback executable controls the second playback processor to decode the digital audio information in accordance with the playback source format.

11. The method of claim 10, wherein the first playback executable is different than the second playback executable.

12. The method of claim 11, further comprising synchronizing decoded digital audio information provided by the first and second playback processors to a common clock.

13. The method of claim 10, wherein second playback executable is wirelessly transmitted from the first control station to the second sound production station after the first playback executable is wireless transmitted from the first control station to the first sound production station.

14. The method of claim 10, further comprising:

transmitting configuration information from the first sound production station to the first control station; and then transmitting configuration information from the second sound production station to the first control station; and generating the first and second playback executables in the first control station in response to the configuration information received from the first and second sound production stations.

15. The method of claim 1, further comprising:

wirelessly transmitting a second playback executable from the first control station to the first sound production station, wherein the second playback executable is generated based on a second playback source format of the first control station;

storing the second playback executable in the first sound production station;

wirelessly transmitting second digital audio information from the first control station to the first sound production station; and decoding the second digital audio information with the playback processor within the first sound production station, wherein the second playback executable controls the playback processor to decode the second digital audio information in accordance with the second playback source format.

16. The method of claim 1, further comprising wirelessly transmitting a second playback executable from a second control station to the first sound production station, wherein the second playback executable is generated based on a second playback source format of the second control station;

storing the second playback executable in the first sound production station;

wirelessly transmitting digital audio information from the second control station to the first sound production station; and decoding the digital audio information transmitted by the second control station with the playback processor within the first sound production station, wherein the second playback executable controls the playback processor to decode the digital audio information transmitted by the second control station in accordance with the second playback source format.

17. The method of claim 16, further comprising:

storing playback system information in the first control station, wherein the playback system information identifies parameters associated with the transmission of the digital audio information from the first control station to the first sound production station; and transferring the playback system information from the first control station to the second control station.

18. The method of claim 1, further comprising:

storing the digital audio information in the first sound production station in response to a first clock signal; and processing the digital information within the playback processor in response to a second clock signal, which is faster than the first clock signal.

19. The method of claim 1, further comprising:

receiving a digital audio stream with the first control station, wherein the digital audio stream has a first coding format;

translating the digital audio stream from the first coding format to a second coding format within the first control station, thereby creating the digital audio information.

20. A cognitive loudspeaker system comprising:

a control station having a transceiver that wirelessly transmits digital audio information and a plurality of playback executables, and receives configuration information, wherein each of the plurality of playback executables is compiled by the control station based on a playback source format of the digital audio information and the received configuration information; and a plurality of sound production stations, each having a transceiver that receives a corresponding one of the plurality of playback executables and the digital audio information wirelessly transmitted from the control station, and each having a playback processor controlled by the corresponding one of the plurality of playback executables to decode the digital audio information in accordance with the playback source format, wherein each of the sound production stations generates an audible output in response to the received digital audio information, and wherein each transceiver of the sound production stations wirelessly transmits configuration information defining operating characteristics of the corresponding sound production station to the control station.

* * * * *